United States Patent
Filsfils et al.

(10) Patent No.: US 9,369,371 B2
(45) Date of Patent: Jun. 14, 2016

(54) METHOD AND SYSTEM FOR PATH MONITORING USING SEGMENT ROUTING

(71) Applicant: Cisco Technology, Inc., San Jose, CA (US)

(72) Inventors: Clarence Filsfils, Brussels (BE); Daniel C. Frost, Feltham Middlesex (GB); Stewart F. Bryant, Merstham (GB); Don R. Heidrich, Brookfield, CT (US)

(73) Assignee: Cisco Technologies, Inc., San Jose, CA (US)

( * ) Notice: Subject to any disclaimer, the term of this patent is extended or adjusted under 35 U.S.C. 154(b) by 238 days.

(21) Appl. No.: 14/292,264

(22) Filed: May 30, 2014

(65) Prior Publication Data

US 2014/0269266 A1 Sep. 18, 2014

Related U.S. Application Data

(63) Continuation-in-part of application No. 14/047,310, filed on Oct. 7, 2013, and a continuation-in-part of application No. 13/760,155, filed on Feb. 6, 2013, now Pat. No. 9,049,233, and a continuation-in-part of (Continued)

(51) Int. Cl.
| | |
|---|---|
| *H04L 12/26* | (2006.01) |
| *H04L 12/751* | (2013.01) |
| *H04L 12/707* | (2013.01) |
| *H04L 12/703* | (2013.01) |
| *H04L 12/723* | (2013.01) |
| *H04L 12/24* | (2006.01) |

(52) U.S. Cl.
CPC ............... *H04L 43/50* (2013.01); *H04L 43/10* (2013.01); *H04L 45/02* (2013.01); *H04L 45/22* (2013.01); *H04L 45/28* (2013.01); *H04L 41/12* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 6,032,197 A | 2/2000 | Birdwell | 709/216 |
| 6,374,303 B1 | 4/2002 | Armitage et al. | 709/242 |
| 6,577,600 B1 | 6/2003 | Bare | 370/238 |

(Continued)

OTHER PUBLICATIONS

Aggarwal, R. and Y. Rekhter, Juniper Networks; E. Rosen, Cisco Systems, Inc.; "MPLS Upstream Label Assignment and Context Specific Label Space;" Network Working Group; Internet Draft; Jan. 2005; pp. 1-8.

(Continued)

*Primary Examiner* — Christine Duong
(74) *Attorney, Agent, or Firm* — Campbell Stephenson LLP

(57) ABSTRACT

A method and system are disclosed for use of segment routing in monitoring of a network path. In one embodiment, the method includes selecting a plurality of segment identifiers and assembling the segment identifiers into a segment identifier stack, where the segment identifier stack encodes a test path within the network for attempted routing of a test message. The method may further include inserting the segment identifier stack into a header associated with the test message, and forwarding the test message according to an entry in a forwarding table corresponding to the segment identifier at the top of the segment identifier stack. Interior gateway protocol advertisements may be used to communicate segment identifiers for creating or updating of the data structure or the forwarding table. In an embodiment, the system includes one or more network interfaces and a processor configured to perform the steps of the method.

21 Claims, 11 Drawing Sheets

Related U.S. Application Data application No. 14/211,174, filed on Mar. 14, 2014, and a continuation-in-part of application No. 13/863,013, filed on Apr. 15, 2013.

(60) Provisional application No. 61/829,696, filed on May 31, 2013, provisional application No. 61/710,121, filed on Oct. 5, 2012, provisional application No. 61/791,242, filed on Mar. 15, 2013, provisional application No. 61/763,224, filed on Feb. 11, 2013.

(56) References Cited

U.S. PATENT DOCUMENTS

| | | | | |
|---|---|---|---|---|
| 6,647,428 | B1 | 11/2003 | Bannai et al. | 709/245 |
| 6,963,570 | B1 | 11/2005 | Agarwal | 370/310.2 |
| 7,023,846 | B1 | 4/2006 | Andersson et al. | 370/389 |
| 7,031,253 | B1 | 4/2006 | Katukam et al. | 370/222 |
| 7,031,607 | B1 | 4/2006 | Aswood Smith | 398/51 |
| 7,061,921 | B1 | 6/2006 | Sheth | 370/395.52 |
| 7,068,654 | B1 | 6/2006 | Joseph et al. | 370/392 |
| 7,072,346 | B2 | 7/2006 | Hama | 370/395.53 |
| 7,088,721 | B1 | 8/2006 | Droz et al. | 370/395.1 |
| 7,154,416 | B1 | 12/2006 | Savage | 341/51 |
| 7,174,387 | B1 | 2/2007 | Shand et al. | 709/238 |
| 7,180,887 | B1 | 2/2007 | Schwaderer | 370/351 |
| 7,260,097 | B2 | 8/2007 | Casey | 370/392 |
| 7,286,479 | B2 | 10/2007 | Bragg | 370/225 |
| 7,330,440 | B1 | 2/2008 | Bryant | 370/254 |
| 7,359,377 | B1 | 4/2008 | Kompella et al. | 370/389 |
| 7,420,992 | B1 | 9/2008 | Fang | 370/477 |
| 7,430,210 | B2 | 9/2008 | Havala et al. | 370/395.53 |
| 7,462,639 | B2 | 12/2008 | Rekhter | 370/409 |
| 7,463,639 | B2 | 12/2008 | Rekhter | 370/409 |
| 7,466,661 | B1 | 12/2008 | Previdi et al. | 370/254 |
| 7,471,669 | B1 | 12/2008 | Sabesan et al. | 370/351 |
| 7,564,803 | B1 | 7/2009 | Minei et al. | 370/254 |
| 7,577,143 | B1 | 8/2009 | Kompella | 370/392 |
| 7,602,778 | B2 | 10/2009 | Guichard et al. | 370/389 |
| 7,610,330 | B1 | 10/2009 | Quinn | 709/201 |
| 7,773,630 | B2 | 8/2010 | Huang et al. | 370/474 |
| 7,817,667 | B2 | 10/2010 | Frederiksen et al. | 370/474 |
| 7,885,259 | B2 | 2/2011 | Filsfils | 370/389 |
| 7,885,294 | B2 | 2/2011 | Patel | 370/207 |
| 7,894,458 | B2 | 2/2011 | Jiang | 370/401 |
| 7,940,695 | B1* | 5/2011 | Bahadur | H04L 43/0811 370/254 |
| 7,983,174 | B1* | 7/2011 | Monaghan | H04L 43/0817 370/242 |
| 8,064,441 | B2 | 11/2011 | Wijnands et al. | 370/389 |
| 8,339,973 | B1* | 12/2012 | Pichumani | H04L 43/10 370/248 |
| 8,422,514 | B1 | 4/2013 | Kothari et al. | 370/466 |
| 8,542,706 | B2 | 9/2013 | Wang et al. | 370/474 |
| 8,630,176 | B2 | 1/2014 | Smith | 370/255 |
| 8,711,883 | B2 | 4/2014 | Kang | 370/389 |
| 8,792,384 | B2 | 7/2014 | Banerjee et al. | 370/254 |
| 8,953,590 | B1 | 2/2015 | Aggarwal | 370/389 |
| 9,036,474 | B2 | 5/2015 | Dibirdi et al. | 370/235 |
| 9,112,734 | B2 | 8/2015 | Edwards et al. | |
| 9,118,572 | B2 | 8/2015 | Sajassi | |
| 2001/0037401 | A1 | 11/2001 | Soumlya | 709/232 |
| 2002/0103732 | A1 | 8/2002 | Bundy et al. | 705/35 |
| 2003/0016678 | A1 | 1/2003 | Maeno | 370/400 |
| 2003/0026271 | A1 | 2/2003 | Erb et al. | 370/401 |
| 2003/0126272 | A1 | 7/2003 | Corl et al. | 709/232 |
| 2003/0142674 | A1 | 7/2003 | Casey | 370/393 |
| 2003/0231634 | A1 | 12/2003 | Henderson | 370/395.32 |
| 2004/0160958 | A1 | 8/2004 | Oh | 370/395.1 |
| 2004/0174879 | A1 | 9/2004 | Basso et al. | 370/392 |
| 2004/0196840 | A1 | 10/2004 | Amrutur et al. | 370/389 |
| 2005/0213513 | A1 | 9/2005 | Ngo | 370/254 |
| 2005/0259655 | A1 | 11/2005 | Cuervo et al. | 370/392 |
| 2006/0002304 | A1 | 1/2006 | Ashwood-Smith | 370/238 |
| 2006/0013209 | A1 | 1/2006 | Somasundaram | 370/389 |
| 2006/0075134 | A1 | 4/2006 | Aalto | 709/238 |
| 2006/0080421 | A1 | 4/2006 | Hu | 709/223 |
| 2006/0092940 | A1 | 5/2006 | Ansari | 370/392 |
| 2006/0262735 | A1 | 11/2006 | Guichard | 370/254 |
| 2006/0274716 | A1 | 12/2006 | Oswal et al. | 370/349 |
| 2007/0019647 | A1 | 1/2007 | Roy et al. | 370/392 |
| 2007/0053342 | A1 | 3/2007 | Slereckl | 370/351 |
| 2007/0058638 | A1 | 3/2007 | Guichard et al. | 370/395.31 |
| 2007/0189291 | A1 | 8/2007 | Tian | 370/390 |
| 2008/0002699 | A1 | 1/2008 | Rajsic | 370/392 |
| 2008/0075016 | A1 | 3/2008 | Ashwood-Smith | 370/252 |
| 2008/0084881 | A1 | 4/2008 | Dharwadkar et al. | 370/392 |
| 2008/0101239 | A1 | 5/2008 | Goode | 370/235 |
| 2008/1010227 | | 5/2008 | Fujita et al. | 370/232 |
| 2008/0172497 | A1 | 7/2008 | Mohan et al. | 709/249 |
| 2008/0189393 | A1 | 8/2008 | Wagner | 709/218 |
| 2008/0192762 | A1 | 8/2008 | Kompella et al. | 370/395.53 |
| 2008/0225864 | A1 | 9/2008 | Aissaoui et al. | 370/401 |
| 2008/0253367 | A1 | 10/2008 | Ould-Brahim | 370/389 |
| 2008/0259820 | A1 | 10/2008 | White et al. | 370/255 |
| 2009/0041038 | A1 | 2/2009 | Luca et al. | 370/401 |
| 2009/0086644 | A1* | 4/2009 | Kompella | H04L 12/2697 370/248 |
| 2009/0135815 | A1 | 5/2009 | Pacella | 370/389 |
| 2010/0063983 | A1 | 3/2010 | Groarke et al. | 707/803 |
| 2010/0124231 | A1 | 5/2010 | Kompella | 370/40 |
| 2010/0142548 | A1 | 6/2010 | Sheth | 370/410 |
| 2010/0220739 | A1 | 9/2010 | Ishiguro | 370/401 |
| 2010/0232435 | A1 | 9/2010 | Jabr | 370/392 |
| 2010/0284309 | A1 | 11/2010 | Allan et al. | 370/256 |
| 2011/0228780 | A1 | 9/2011 | Ashwood-Smith | 370/392 |
| 2011/0268114 | A1 | 11/2011 | Wijnands et al. | 370/389 |
| 2011/0280123 | A1 | 11/2011 | Wijnands et al. | 370/228 |
| 2011/0286452 | A1 | 11/2011 | Balus | 370/390 |
| 2012/0044944 | A1 | 2/2012 | Kotha et al. | 370/401 |
| 2012/0069740 | A1 | 3/2012 | Lu et al. | 370/238 |
| 2012/0069845 | A1 | 3/2012 | Carnet et al. | 370/392 |
| 2012/0082034 | A1 | 4/2012 | Vasseur | 370/235 |
| 2012/0120808 | A1 | 5/2012 | Nandagopal et al. | 370/238 |
| 2012/0213225 | A1 | 8/2012 | Subramanian et al. | 370/392 |
| 2012/0218884 | A1 | 8/2012 | Kini | 370/228 |
| 2012/0307629 | A1 | 12/2012 | Vasseur | 370/228 |
| 2013/0003728 | A1 | 1/2013 | Kwong et al. | 370/389 |
| 2013/0077476 | A1 | 3/2013 | Enyedi | 370/225 |
| 2013/0077626 | A1 | 3/2013 | Keesara et al. | 370/390 |
| 2013/0142052 | A1 | 6/2013 | Burbidge | 370/242 |
| 2013/0188634 | A1 | 7/2013 | Magee | 370/389 |
| 2013/0219034 | A1* | 8/2013 | Wang | H04L 12/2809 709/222 |
| 2013/0258842 | A1 | 10/2013 | Mizutani | |
| 2013/0266012 | A1 | 10/2013 | Dutta et al. | 370/392 |
| 2013/0266013 | A1 | 10/2013 | Dutta et al. | 370/392 |
| 2013/0343204 | A1 | 12/2013 | Geib et al. | 370/248 |
| 2014/0098675 | A1 | 4/2014 | Frost et al. | 370/241.1 |
| 2014/0169370 | A1 | 6/2014 | Filsfils et al. | 370/392 |
| 2014/0177638 | A1 | 6/2014 | Bragg et al. | 370/395.3 |
| 2014/0254596 | A1 | 9/2014 | Filsfils et al. | 370/392 |
| 2014/0269421 | A1 | 9/2014 | Previdi et al. | 370/254 |
| 2014/0269422 | A1 | 9/2014 | Filsfils et al. | 370/254 |
| 2014/0269698 | A1 | 9/2014 | Filsfils et al. | 370/389 |
| 2014/0269699 | A1 | 9/2014 | Filsfils et al. | 370/389 |
| 2014/0269721 | A1 | 9/2014 | Bashandy et al. | 370/392 |
| 2014/0269725 | A1 | 9/2014 | Filsfils et al. | 370/392 |
| 2014/0269727 | A1 | 9/2014 | Filsfils et al. | 370/392 |
| 2014/0286195 | A1 | 9/2014 | Fedyk | 370/254 |
| 2014/0317259 | A1 | 10/2014 | Previdi et al. | 709/223 |
| 2014/0341222 | A1 | 11/2014 | Filsfils et al. | 370/395.5 |
| 2014/0369356 | A1 | 12/2014 | Bryant et al. | 370/392 |

OTHER PUBLICATIONS

Awduche, Daniel O., et al., "RSVP-TE: Extensions to RSVP for LSP Tunnels," Network Working Group, Internet-Draft, Feb. 2001, pp. 1-12.

Awduche, Daniel O., et al., "RSVP-TE: Extensions to RSVP for LSP Tunnels," Network Working Group, Request for Comments 3209, Dec. 2001, pp. 1-61.

Backes, P. and Rudiger Geib, "Deutsche Telekom AG's Statement About IPR Related to Draft-Geig-Spring-OAM-Usecase-01," Feb. 5, 2014, pp. 1-2.

(56) References Cited

OTHER PUBLICATIONS

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S.. et al., Cisco Systems, "Remote LFA FRR,"draft-ietf-rtgwg-remote-lfa-04, Network Working Group, Internet-Draft, Nov. 22, 2013, pp. 1-24.
Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-2.
Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.
Deering, S., et al., Cisco, Internet Protocol, Version 6 (IPv6) Specification, Network Working Group, Request for Comments 2460, Dec. 1998, pp. 1-39.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol-Traffic Engineering (RSVP-TE) Extensions, Network Working Group, Request for Comments 5151, Feb. 2008.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013, pp. 1-28.
Filsfils, C., et al., Cisco Systems, Inc., "Segment Routing Architecture," draft-filsfils-rtgwg-segment-routing-01, Network Working Group, Internet-Draft, Oct. 21, 2013, pp. 1-28.
Frost, D., et al., Cisco Systems, Inc., "MPLS Generic Associated Channel (G-Ach) Advertisement Protocol," draft-ictf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case," IETF 87, Berlin, Jul./Aug. 2013, pp. 1-3.
Geib, R., Deutsch Telekom, "Use Case for a Scalable and Topology Aware MPLS data plan monitoring System," draft-geib-spring-oam-usecase-00; Internet-Draft, Oct. 17, 2013, pp. 1-11.
Geib, R., Deutsch Telekom, "Use Case for a Scalable and Topology Aware MPLS data plan monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Engineering (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.

Kompella, K. et al., Juniper Networks,"Virtual Private Lan Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Raszuk, R., NTT 13, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pec-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamitc and Hitoshi Fukuda, NTT Communications; "Multicast Extensions for LDP;" Network Working Group; Internet Draft; Mar. 2005; pp. 1-12.
Eckert, Toerless et al., "Failure Protection for Traffic-Engineered Bit Indexed Explicit Replication", U.S. Appl. No. 15/054,480 filed Feb. 26, 2016; consisting of Specification, Claims, Abstract, and Drawings (76 pages).
Cisco Systems, Inc., "Introduction to Intermediate System-to-Intermediate System Protocol," published 1992-2002; pp. 1-25.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., "Traffic Engineering for Bit Index Explicit Replication BIER-TE, draft-eckert-bier-te-arch-01," Network Working Group, Internet-Draft, Jul. 5, 2015, pp. 1-23.
Eckert, Toerless et al., "Traffic Engineering for Bit Index Explicit Replication," U.S. Appl. No. 14/814,574 filed on Jul. 31, 2015; consisting of Specification, Claims, and Abstract (75 pages); and Drawings (18 sheets).
Eckert, Toerless et al., "Traffic Engineering for Bit Index Explicit Replication," U.S. Appl. No. 14/862,915 filed on Sep. 23, 2015; consisting of Specification, Claims, and Abstract (75 pages); and Drawings (18 sheets).
Francois, Pierre Jean Rene; "Loop Avoidance During Network Convergence In Switched Networks"; U.S. Appl. No. 14/319,353, filed on Jun. 30, 2014; consisting of Specification, Claims and Abstract (29 pages); and Drawings (6 sheets).
Previdi, Stefano B.; "Segment Routing Using A Remote Forwarding Adjacency Identifier"; U.S. Appl. No. 14/334,300 filed on Jul. 17, 2014; consisting of Specification, Claims and Abstract (23 pages); and Drawings (8 sheets).
Previdi, Stefano B.; "Segment Routing Extension Headers"; U.S. Appl. No. 14/212,084 filed on Mar. 14, 2014; consisting of Specification, Claims and Abstract (43 pages); and Drawings (17 sheets).
Filsfils, C. et al., Cisco Systems, Inc., "Segment Routing Interoperability with LDP", draft-filsfils-spring-segment-routing-ldp-interop-01.txt; Apr. 18, 2014, pp. 1-16.

(56) References Cited

OTHER PUBLICATIONS

Li, T., et al., Redback Networks, Inc., "IS-IS Extensions for Traffic Engineering," Network Working Group, Request for Comments 5305, Oct. 2008, 17 pages.

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).

* cited by examiner

| Adjacency Source Node | Adjacency Dest. Node | Protect? | Segment ID |
|---|---|---|---|
| A | B | N | 891 |
| B | A | N | 562 |
| B | C | N | 892 |
| C | B | N | 563 |
| C | D | N | 893 |
| D | C | N | 564 |
| D | Z | N | 894 |
| D | Z | Y | 884 |
| Z | D | N | 565 |
| Z | D | Y | 555 |

Segment ID Stack 1

| 891 |
| 892 |
| 893 |
| 894 |
| 565 |
| 564 |
| 563 |
| 562 |

Segment ID Stack 2

| 891 |
| 892 |
| 893 |
| 564 |
| 563 |
| 562 |

Segment ID Stack 3

| 891 |
| 892 |
| 563 |
| 562 |

Segment ID Stack 4

| 891 |
| 562 |

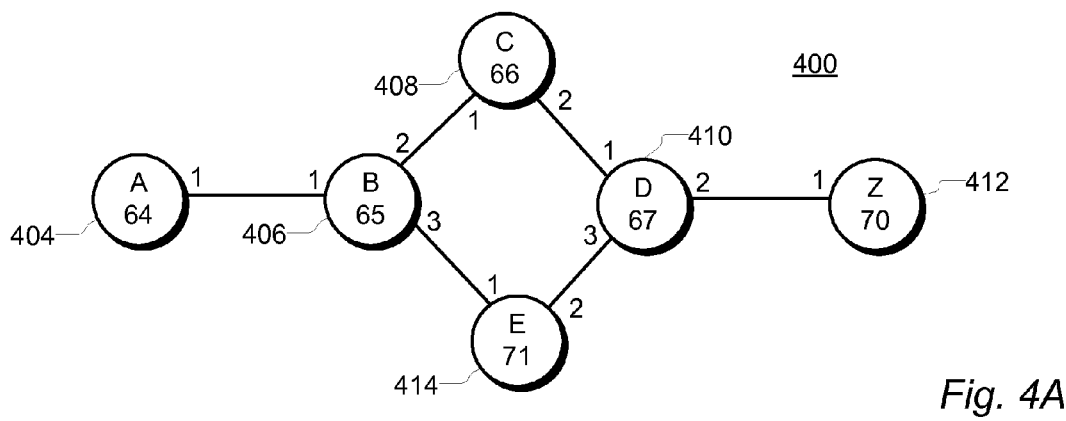

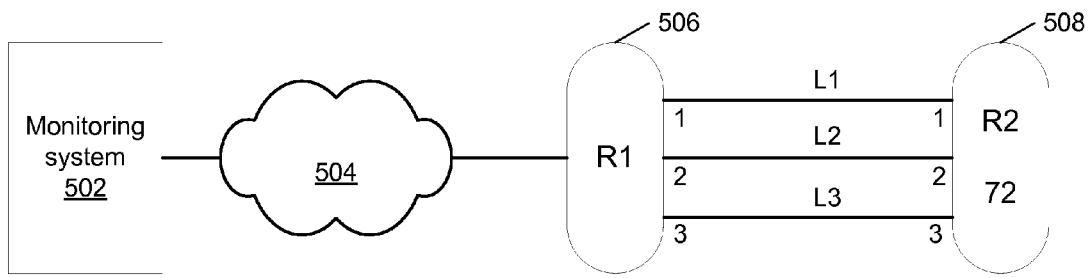

METHOD AND SYSTEM FOR PATH MONITORING USING SEGMENT ROUTING

RELATED APPLICATIONS

This application claims the domestic benefit under Title 35 of the United States Code §119(e) of U.S. Provisional Patent Application No. 61/829,696, entitled "Backup Node Segment and Service Mirroring," filed May 31, 2013, which is hereby incorporated by reference in its entirety and for all purposes as if completely and fully set forth herein. This application is also a continuation-in-part of U.S. patent application Ser. No. 14/047,310, entitled "Segment Routing Techniques," filed Oct. 7, 2013, which in turn claims priority to U.S. Provisional Patent Application Ser. No. 61/710,121 entitled "Methods for Using Chain Routing," filed Oct. 5, 2012, both of which are hereby incorporated by reference in their entirety and for all purposes as if completely and fully set forth herein. This application is further a continuation-in-part of U.S. patent application Ser. No. 13/760,155, entitled "MPLS Segment-Routing," filed Feb. 6, 2013, which in turn claims priority to U.S. Provisional Patent Application Ser. No. 61/710,121 entitled "Methods for Using Chain Routing," filed Oct. 5, 2012. Along with the other applications referenced above, above-cited application Ser. No. 13/760,155 is hereby incorporated by reference in its entirety and for all purposes as if completely and fully set forth herein. This application is further a continuation-in-part of U.S. patent application Ser. No. 14/211,174, entitled "Encoding Explicit Paths as Segment Routing Segment Lists," filed Mar. 14, 2014, which in turn claims priority to U.S. Provisional Application Ser. No. 61/791,242, entitled "Segment Routing," filed Mar. 15, 2013, both of which are hereby incorporated by reference in their entirety and for all purposes as if completely and fully set forth herein. In addition, this application is a continuation-in-part of U.S. patent application Ser. No. 13/863,013, entitled "Packet Metadata Channels Carrying Infrastructure Metadata in Networks," filed Apr. 15, 2013, which in turn claims priority to U.S. Provisional Application Ser. No. 61/763,224, filed Feb. 11, 2013, both of which are hereby incorporated by reference in their entirety and for all purposes as if completely and fully set forth herein.

TECHNICAL FIELD

This disclosure relates to networking and, more particularly, to monitoring of paths in networks.

BACKGROUND

Network nodes are capable of receiving and forwarding packets being sent through a communications network. A network node may take the form of one or more routers, one or more bridges, one or more switches, one or more servers, or any other suitable communications processing device. A packet, which may also be referred to as a "message" herein, is a formatted unit of data that typically contains control information and payload data. Control information may include, for example: address information, error detection codes like checksums, and sequencing information. Control information is typically found in packet headers and trailers, and payload data is typically found in between the headers and trailers.

Packet forwarding involves decision processes that, while simple in concept, can be complex. Since packet forwarding decisions are handled by nodes, the total time required to perform packet forwarding decision processes can become a major limiting factor in overall network performance.

Another factor that can affect network performance is, of course, the integrity of the network itself. For example, a non-functioning link between a pair of network nodes can result in lost packets or in network delays caused by re-routing of packets. Operations, Administration and Maintenance (OAM) activities include operations designed to monitor or measure network path variables such as packet loss or transmission delay.

BRIEF DESCRIPTION OF THE DRAWINGS

The present invention may be better understood, and its numerous objects, features and advantages made apparent to those skilled in the art by referencing the accompanying drawings.

FIG. 3A is a diagram illustrating an example network.

FIG. 3B is a diagram illustrating an exemplary portion of a data structure relating network nodes to segment identifiers.

FIGS. 3C and 3D are graphical illustrations of a series of segment identifier stacks.

FIG. 4A is a diagram illustrating an example network.

FIGS. 4B through 4D are graphical illustrations of segment identifier stacks.

FIG. 5A is a diagram illustrating an example network.

FIG. 5B is a diagram illustrating an exemplary portion of a data structure relating network nodes to segment identifiers.

FIG. 5C is a diagram illustrating an exemplary portion of a routing table.

FIG. 5D is a graphical illustration of a segment identifier stack.

DETAILED DESCRIPTION

Overview

Figure 1:
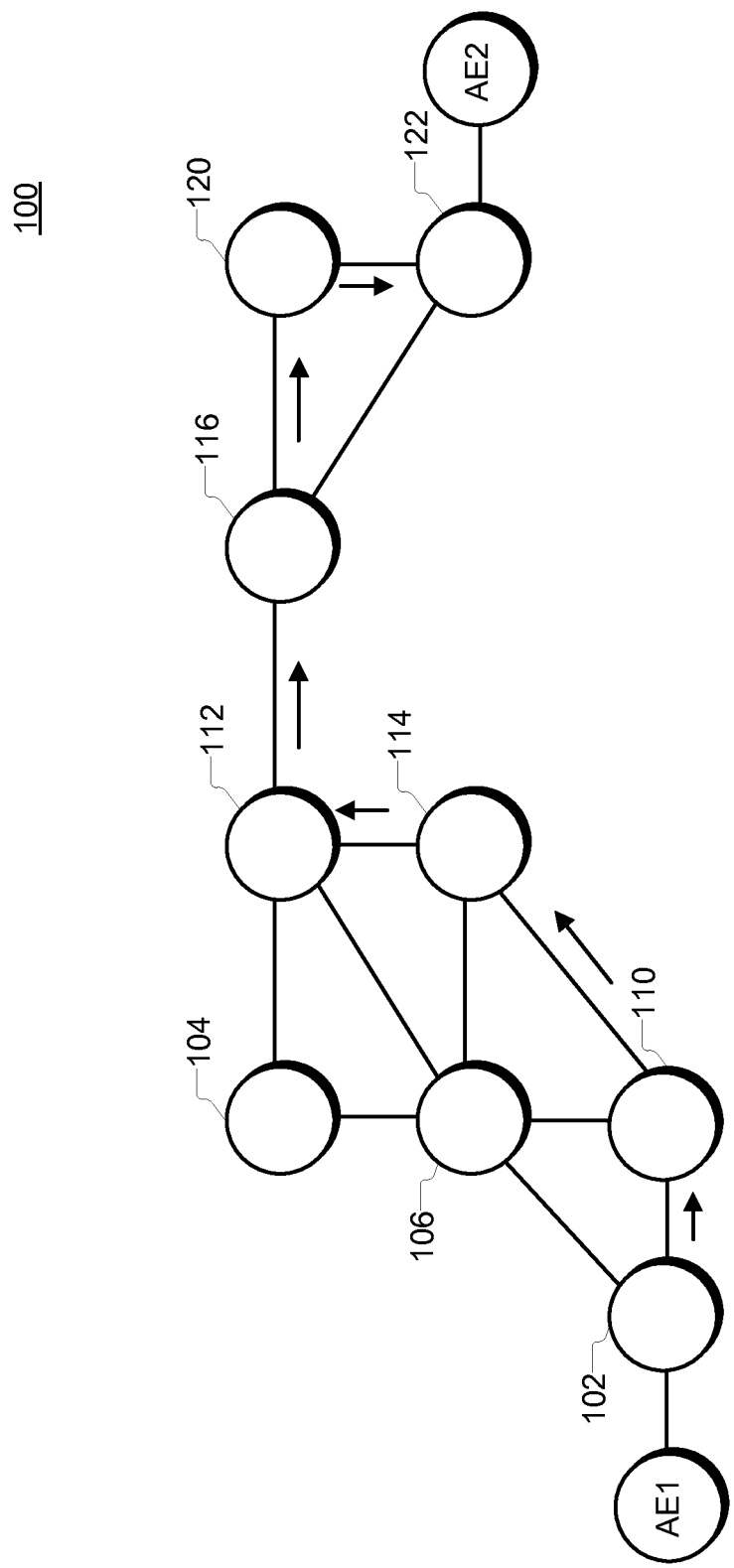
FIG. 1 is a diagram illustrating an example network.

A method and system are disclosed for use of segment routing in monitoring of a network path. In one embodiment, the method includes selecting a plurality of segment identifiers and assembling the segment identifiers into a segment identifier stack, where the segment identifier stack encodes a test path within the network for attempted routing of a test message. The method may further include inserting the segment identifier stack into a header associated with the test message, and forwarding the test message according to an entry in a forwarding table corresponding to the segment identifier at the top of the segment identifier stack. In an embodiment, selecting the plurality of segment identifiers includes accessing a data structure relating each of the segment identifiers to one or more nodes within a network, and interior gateway protocol (IGP) advertisements are used to communicate the segment identifiers for creation or updating of the data structure. IGP advertisements are also used to communicate the segment identifier at the top of the segment stack for creation or updating of the forwarding table.

Routing

Routing is a process for forwarding network traffic (e.g., packets) to destinations. Commonly-employed packet forwarding mechanisms include Internet Protocol (IP) routing and Multiprotocol Label Switching (MPLS). IP routing uses IP addresses inside packet headers to make forwarding decisions. In contrast, MPLS nodes (i.e., nodes employing MPLS) can make forwarding decisions using short path identifiers called labels that are attached to packets. Segment routing (SR) is yet another packet forwarding mechanism, in which packet forwarding decisions are based on short path identifiers called segment identifiers attached to packets.

Operation of routing mechanisms such as IP or MPLS can be described in terms of a "control plane" and a "data plane." The data plane, also referred to as the "forwarding plane," does the actual forwarding of packets coming into a node. Data plane decisions may involve accessing a forwarding table that relates the appropriate packet identifier (such as an IP address or MPLS label) to the specific network interface, or egress interface, the packet should be sent to in order to send it in the right direction. Generating such a forwarding table, based on a map, database, or other information reflecting the topology of the network, is a function of the control plane.

The control plane generates and updates its network topology information using one or more routing protocols. Within an autonomous system, an interior gateway protocol (IGP) is used for exchanging network topology information between nodes. An autonomous system, or routing domain, as used herein refers to a collection of interconnected network nodes under a common administration for purposes of network configuration. Exchange of routing information between autonomous systems is done using an exterior gateway protocols such as Border Gateway Protocol (BGP).

There are different types of IGPs, which vary in terms of, for example, the particular information exchanged between nodes, whether information is shared only with neighbor nodes or "flooded" throughout the autonomous system, and how often the exchanged information is updated. In one type of IGP called a link-state routing protocol, every router constructs a topological map of network connectivity in the form of a graph, showing which routers are connected to which other routers. Each router can use its map to independently calculate the best logical path from it to every possible destination in the network. The collection of best paths will then form the routing table. Examples of link-state routing protocols include the intermediate system to intermediate system (IS-IS) and the Open Shortest Path First (OSPF) protocols.

Messages called advertisements are used in IGPs to exchange information. Nodes in an IP network automatically exchange network topology information through IGP advertisements. MPLS is compatible with IP networks, and MPLS forwarding may be incorporated into a portion of an IP network such as the Internet, forming an IP/MPLS network. Like IP nodes, MPLS nodes in an IP/MPLS network automatically exchange network topology information through IGP advertisements.

IP Routing

IP routing uses IP forwarding tables in the data plane, which are created at nodes using routing information distributed between nodes via an IGP and/or exterior gateway protocol. In simple terms, IP forwarding tables map destination IP addresses to the next hops that packets take to reach their destinations. When a node receives a packet, the node can access a forwarding table using the destination address in the packet and look up a corresponding egress interface for the next hop. The node then forwards the packet through the egress interface. The next hop that receives the packet performs its own forwarding table lookup using the same destination IP address, and so on.

MPLS and LDP

MPLS is commonly employed in provider networks. Packets enter an MPLS network via an ingress edge node, travel hop-by-hop along a label-switched path (LSP) that typically includes one or more core nodes, and exit via an egress edge node.

Packets are forwarded along an LSP based on labels and Label Distribution Protocol (LDP) forwarding tables. Labels allow for the use of very fast and simple forwarding engines in the data plane of a network node, as compared to IP forwarding in which the destination IP address must be retrieved from the packet header at each node. Another benefit of MPLS is the elimination of dependence on a particular Open Systems Interconnection (OSI) model data link layer technology to forward packets.

A label is a short (compared, for example, to an IP address), fixed-length, locally significant identifier. An MPLS label is implemented as a 32-bit identifier, with the lowest 20 bits allocated to the label value. The MPLS label is inserted between the IP header and data link layer header (for example, an Ethernet header) of a packet. In certain situations, such as when one MPLS domain is contained within another domain, more than one label is carried by a packet, forming a label stack. The uppermost label in a stack is closest to the data link layer header (i.e., closest to the outside of the packet). A node generally needs to read only the uppermost label in the stack for packet forwarding purposes.

MPLS labels can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In many ways, LSPs are no different than circuit-switched paths in ATM or Frame Relay networks, except that they are not dependent on a particular Layer 2 technology.

LDP is a protocol employed in the control planes of nodes. Two nodes, called LDP peers, can bi-directionally exchange labels on a FEC-by-FEC basis. LDP, along with underlying routing information provided using an IGP, can be used in a process of building and maintaining LDP forwarding tables that map labels and next-hop egress interfaces. These forwarding tables can be used to forward packets through MPLS networks.

When a packet is received by an ingress edge node of an MPLS network, the ingress node may determine a corresponding FEC. Characteristics for determining the FEC for a packet can vary, but typically the determination is based on the packet's destination IP address. Quality of Service for the packet or other information may also be used to determine the FEC. Once determined, the ingress edge node can access a table to select a label that is mapped to the FEC. The table may also map a next hop egress interface to the FEC. Before the ingress edge node forwards the packet to the next hop via, the ingress node attaches the label.

When a node receives a packet with an attached label (i.e., the incoming label), the node accesses an LDP forwarding table to read a next hop egress interface and another label (i.e., an outgoing label), both of which are mapped to the incoming label. Before the packet is forwarded via the egress interface, the node swaps the incoming label with the outgoing label. The next hop receives the packet with label and may perform the same process. This process is often called hop-by-hop forwarding along a non-explicit path. The penultimate node in the LSP may pop or remove the incoming label before forwarding the packet to an egress edge node in the network, which in turn may forward the packet towards its destination using the packet's destination address and an IP forwarding table.

To illustrate the concept of an MPLS LSP, FIG. 1 shows a portion of an example MPLS network 100 between access network nodes AE1 and AE2 which may connect, for example, to a traditional IP network. The MPLS network includes nodes 102-122 coupled together via communication links. An LSP from node 102 to node 122 can be created so that all packets of a stream associated with a particular FEC sent from node 102 to node 122 will travel through the same set of nodes. Each node maintains information for an LSP established through it in an LDP forwarding table. Thus, if node 110 knows that node 114 is the next hop along the LSP for all packets received from node 102 that are destined for node 122, node 110 can forward the packets to node 114.

When LDP is used to exchange labels and set up LSPs in an MPLS network, the LSPs are typically established based on a shortest-path algorithm. Multiple LSPs between the same source and destination nodes may also be established for purposes of load-balancing in the network, through, for example, the equal-cost multi-path (ECMP) load balancing often employed in IP networks. This multi-path operation makes it difficult to monitor the performance of a specific network path in terms of, for example, packet loss or transmission delay.

An explicit path can be established in an MPLS network by using a protocol called Resource Reservation Protocol with Traffic Engineering (RSVP-TE) instead of or in addition to LDP. An explicit path, or "tunnel" is specified using RSVP-TE when the initial node sends a request message from node to node along the length of the requested LSP, and the final node of the path confirms by sending back along the path the MPLS labels to be used for the path. These labels must then be added to the forwarding tables of the nodes along the path. The reservation process must be done again if the LSP is altered in response to a change in network topology or conditions. Particularly if monitoring of multiple explicit paths is desired, the time, signaling overhead, and label storage required for using RSVP-TE for OAM purposes can be prohibitive.

Segment Routing

Segment routing (SR) is a mechanism in which nodes forward packets using SR forwarding tables and segment identifiers (IDs). Like MPLS, segment routing enables a very fast and simple forwarding engine in the data plane of a node. Segment routing is not dependent on a particular Open Systems Interconnection (OSI) model data link layer technology to forward packets.

In an embodiment, segment routing differs significantly from MPLS routing in the control plane. Segment routing nodes (i.e., nodes employing SR) make packet forwarding decisions based on segment IDs as opposed to labels, and as a result SR nodes need not employ LDP in their control planes. Unless otherwise indicated, the SR nodes described below lack LDP in the control plane. Instead of being exchanged using a separate protocol such as LDP or RSVP-TE, segment identifiers are communicated among nodes using the IGP advertisements already employed to automatically exchange topography information in IP networks. In an embodiment, this IGP advertisement of SR identifiers is done through extensions to IGP protocols such as the IS-IS and OSPF protocols and to exterior gateway protocols such as BGP.

Certain embodiments of the segment routing methods and systems described herein are realized using data planes associated with other routing mechanisms, such as the Internet Protocol version 6 (IPv6) data plane or the MPLS data plane. In the case of the MPLS data plane, for example, segment identifiers are in one embodiment formatted as MPLS labels and included in an LDP forwarding table, so that the MPLS data plane is not altered. In the case of the IPv6 data plane, segment identifiers are in one embodiment included in an optional extension header provided for in the IPv6 specification. It should be understood that, unless otherwise indicated, any of the segment routing methods or systems described herein may be realized using the MPLS, IPv6, or any other data plane, in addition to a pure segment routing data plane.

Packets can enter an SR-enabled network via an ingress edge node, travel hop-by-hop along a segment path (SP) that includes one or more core nodes, and exit the network via an egress edge node. An SR-enabled network includes means of generating segment identifiers, communicating segment IDs among nodes, and forwarding packets based on segment IDs. These functions are described in more detail within the segment routing description below.

Like MPLS labels, segment IDs are short (relative to the length of an IP address or a FEC), fixed-length identifiers. Segment IDs may correspond to a topological instruction, such as a segment of a network, or a service instruction, such as a service provided by a network node. Topological segments represent one-hop or multi-hop paths to SR nodes. Topological segments act as sub-paths that can be combined to form a segment path. Stacks of segment IDs can represent segment paths, and segment paths can be associated with FECs as is further described below.

There are several types of segment IDs including nodal segment IDs, adjacency segment IDs, area segment IDs, service segment IDs, etc. Nodal segment IDs (also called "node segment IDs") are typically assigned to nodes such that no two SR nodes belonging to an autonomous system are assigned the same nodal segment ID. In an embodiment, nodal segment IDs are assigned to nodes by a path computation element (PCE) server, or other control-plane server. In some embodiments, a user, such as a network administrator, detects a node coming online or joining a network and assigns the node a nodal segment ID. Nodal segment IDs can be mapped to unique SR node identifiers such as node loopback IP addresses (hereinafter node loopbacks). In one embodiment, all assigned nodal segment IDs are selected from a predefined ID range (e.g., [32, 5000]). In a further embodiment, a separate, smaller ID range for nodal segment IDs is assigned to each node, allowing a node to determine its own nodal segment ID or IDs within the assigned range. A nodal segment ID corresponds to a one-hop or a multi-hop path to an SR node assigned the nodal segment ID, as is more fully described below. In certain embodiments, multiple nodal segment IDs are assigned to the same node. Multiple nodal segment IDs for a node may, for example, allow alternate paths to the node to be defined for traffic engineering purposes. The converse situation is not permitted, however: a single nodal segment ID cannot be associated with more than one node.

An adjacency segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs referenced to loopbacks are unique. Link IDs should not be confused with adjacency segment IDs; adjacency segment IDs may not be unique within a network.

Each SR node can assign one or more distinct adjacency segment IDs for each of the node's links. Adjacency segment IDs are locally significant; separate SR nodes may assign the same adjacency segment ID, but that adjacency segment ID represents distinct links. In one embodiment, adjacency segment IDs are selected from a predefined range that is outside the predefined range for nodal segment IDs.

SR nodes can advertise routing information including nodal segment IDs bound to loopbacks, adjacency segment IDs mapped to link IDs, etc., using protocols such as IGP and/or BGP with SR extension. Nodes can use the routing information they receive to create or update SR forwarding tables. To illustrate, SR nodes may in one embodiment use the routing information they receive and protocols such as open shortest path first (OSPF) with SR extension in order to create topology maps of the network, which in turn can be used to identify next hop egress interfaces of shortest paths (SPTs) to respective node loopbacks. The identified SPT or next hop egress interfaces are then mapped to respective nodal segment IDs in an SR forwarding table. Nodes can also map their adjacency segment IDs to egress interfaces for respective links in SR forwarding tables. Because adjacency segment IDs are only locally significant, however, adjacency segment IDs should only be mapped in SR forwarding tables of the nodes that advertise the adjacency segment IDs. In other words, an SR node that advertises an adjacency segment ID should be the only node in the network area that has an SR forwarding table that maps the adjacency segment ID to an egress interface.

As noted above, SR enables segment paths (SPs), which can be used for transporting packets through a network. Segment paths can be associated with FECs, and can be established for a variety of purposes. Packets associated with the same FEC normally traverse the same segment path towards their destination. Nodes in segment paths make forwarding decisions based on segment IDs, not based on the contents (e.g., destination IP addresses) of packets. As such, packet forwarding in segment paths is not dependent on a particular Layer 2 technology.

Edge nodes and/or other devices (e.g., a centralized control plane server) of an SR network use routing information (nodal segment IDs bound to loopbacks, adjacency segment IDs mapped to link IDs, etc.) they receive in link advertisements to create ordered lists of segment IDs (i.e., segment ID stacks). Segment ID stacks correspond to respective segment paths. Individual segment IDs in a segment ID stack may correspond to respective segments or sub paths of a corresponding segment path.

When an SR ingress edge node receives a packet, the node or a centralized control plane server in data communication with the node, can select a segment path for the packet based on information contained in the packet. In one embodiment, a FEC may be calculated for the packet using the packet's destination address. The FEC is then used to select a segment ID stack mapped thereto. The ingress edge node can attach the selected segment ID stack to the packet via an SR header. The packet with the attached segment ID stack is forwarded along and can traverse the segments of the SP in an order that corresponds to the list order of the segment IDs in the segment ID stack. A forwarding engine operating in the data plane of each SR node can use the top segment ID within the segment ID stack to lookup the egress for the next hop. As the packet and attached segment ID stack are forwarded along the SP in a hop-by-hop fashion, segment IDs can be popped off the top of the segment ID stack. In another embodiment, the attached stack of segment IDs remains unchanged as the packet is forwarded along the SP. In this embodiment, a pointer to an active segment ID in the segment ID stack can be advanced as the packet is forwarded along the SP. In contrast to MPLS, however, segment IDs are typically not swapped as the packet and attached segment ID stack are forwarded along the SP.

Figure 2:
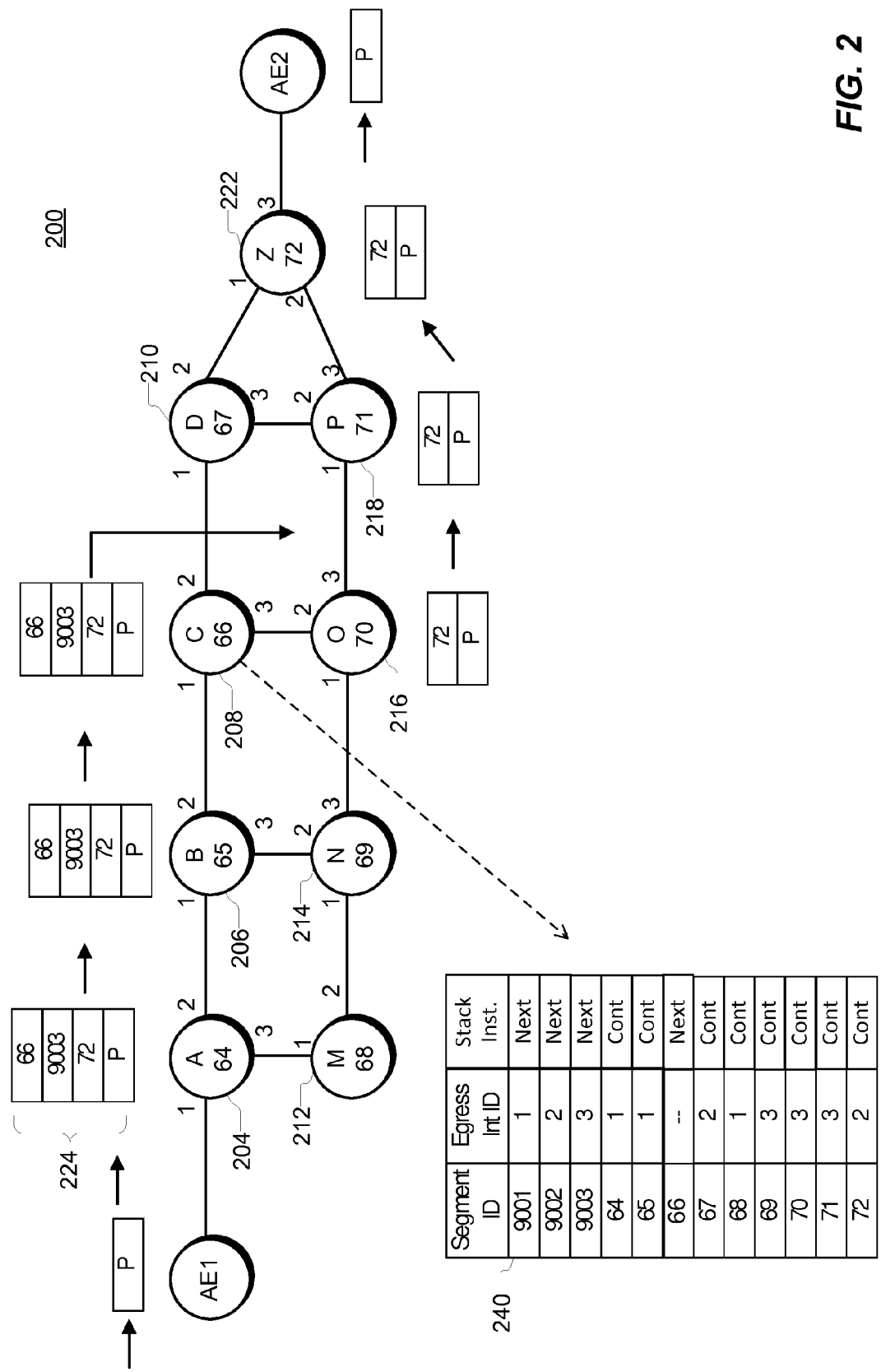
FIG. 2 is a diagram illustrating an example network, routing table, and segment identifier stack.

To illustrate general concepts of segment routing, FIG. 2 shows an example of an SR enabled provider network that is in data communication with access network nodes AE1 and AE2. In the embodiment of FIG. 2, network 200 consists of SR nodes 204-222. Nodes 204-210 are assigned unique nodal segment IDs 64-67, respectively, nodes 212-218 are assigned unique nodal segment IDs 68-71, respectively, and node 222 is assigned a unique nodal segment ID of 72. Each of the SR nodes 204-222 has interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, and loopback Z is assigned to node 222. These loopbacks are unique in the network and can be used for several purposes such as calculating the topology of network 200, which in turn can be used to create segment paths and/or to calculate paths according to a routing algorithm and thus determine next hop egress interfaces for SR forwarding tables. Nodes 204-222 can also assign locally significant adjacency segment IDs. For example, node 208 can assign adjacency segment IDs 9001-9003 to links CB, CD, and CO, respectively.

Each of SR nodes 204-222 can advertise routing information to the other nodes in network 202 using an IGP with SR extensions. For example, node 208 can generate and send one or more link state advertisements that include adjacency segment IDs 9001-9003 bound to link IDs CB, CD, and CO, respectively, and nodal segment ID 66 bound to loopback C. One of ordinary skill understands that link state advertisements may contain additional information. Using the advertisements they receive, the control planes of nodes 204-222 can generate respective SR forwarding tables for use in the data planes. For example, node 208 can generate example SR forwarding table 240 that maps adjacency segment IDs 9001-9003 to node interface IDs 1-3, respectively, and nodal segment IDs such as 64, 65, 67, 70, and 72, to node 208 interfaces 1, 1, 2, 3, and 2, respectively, which are the next hop egress interfaces determined by node 208 for loopbacks A, B, D, O, and Z respectively. It is noted that in the embodiment shown, only SR forwarding table 240 maps adjacency segment IDs 9001-9003 to interfaces; SR forwarding tables in the other nodes of network 202 should not map adjacency segment IDs 9001-9003. In the embodiment of FIG. 2, SR forwarding table 240 also maps each segment ID to a stack instruction, discussed further below.

In addition to creating SR forwarding tables based on received segment ID advertisements, certain SR nodes or a centralized control plane server (not shown) can create segment ID stacks for respective segment paths. For example, ingress edge node 204 creates example segment ID stack 224 for a segment path between ingress edge node 204 and egress edge node 222. Example segment stack 224 can be created for a particular FEC (e.g., FEC F). Example stack 224 includes three segment IDs: nodal segment IDs 66 and 72 advertised by nodes 208 and 222, respectively, and adjacency segment ID 9003 advertised by node 208. Stack 224 corresponds to a segment path in which packets flow in order through nodes 204, 206, 208, 216, 218, and 222.

In response to receiving a packet from access node AE1, SR node 204 or a centralized control plane server (not shown)

can select a segment ID stack based on information contained in the packet. For example, node 204 can calculate FEC F for a received packet P based on the destination IP address in packet P. FEC F is mapped to example segment ID stack 224 in a table not shown. Node 204 attaches segment ID stack 224 to packet P. Example segment ID stack 224 lists segment IDs that correspond to one-hop and multi-hop segments that packets traverse to reach egress edge node 222. The segments collectively form the segment path corresponding to segment ID stack 224. Once the segment ID stack 224 is attached to packet P, ingress SR enabled node 204 may use the top segment ID in the stack to access an SR forwarding table for node 204 (not shown), similar to forwarding table 240 for node 208. In such a forwarding table, the top segment ID (in this embodiment, segment ID=66) would correspond to egress interface identifier 2, which is the next hop egress interface calculated by node 204 for reaching node 208 (which corresponds to nodal segment ID 66).

In an embodiment, an SR forwarding table such as table 240 may map each segment ID to a stack instruction in addition to an egress interface. In one such embodiment, the stack instruction mapped to a nodal segment ID other than the nodal segment ID of the node doing the forwarding is "Continue." A Continue instruction tells the forwarding node to leave the top segment ID in the segment ID stack in place when forwarding the packet to the next node along the segment path. In the embodiment of FIG. 2, SR forwarding tables in nodes 204 and 206 map top segment ID 66 to a Continue stack instruction in addition to the appropriate egress interface. As a result, nodes 204 and 206 leave top segment ID 66 in place when forwarding packet P and its attached segment ID stack along the segment path.

When the packet of FIG. 2 reaches node 208 having nodal segment ID 66, SR forwarding table 240 maps top segment ID 66 to a "Next" stack instruction. A Next instruction tells the forwarding node to remove the top segment identifier so that the next segment identifier in the stack becomes the top identifier. At node 208 in FIG. 2, nodal segment ID 66 has served its purpose of bringing the packet to its associated node and is then removed from the stack. Because node 208 is the endpoint of nodal segment ID 66, no egress interface is mapped to nodal segment ID 66 in SR forwarding table 240. Instead, the forwarding engine of node 208 looks to the next segment ID in the stack after removing segment ID 66. In the embodiment of FIG. 2, the next segment ID in the stack is adjacency segment ID 9003 associated with link CO. SR forwarding table 240 maps segment ID 9003 to egress interface 3 and to a Next stack instruction. Because an adjacency segment identifier encodes only a single link in a segment path, it does not remain active in the segment stack once the packet is forwarded across the corresponding link. Node 208 therefore does not need to retain segment ID 9003 and removes it before forwarding the packet via egress interface 3.

Following removal of segment identifiers 66 and 9003 at node 208, only nodal segment ID 72 remains in the segment ID stack when the packet is received at node 216. Because nodal segment ID 72 is not assigned to nodes 216 or 218, these nodes forward the packet with its segment ID stack unchanged, according to a Continue stack instruction mapped to segment ID 72 in their respective SD forwarding tables (not shown). In the embodiment of FIG. 2, when the packet reaches node 222 having nodal segment ID 72, segment ID 72 is removed according to a Next instruction mapped to segment ID 72 in the SR forwarding table for node 222 (not shown). No further segment IDs remain in segment ID stack 224 at this point. In an embodiment, the forwarding engine of node 222 employs traditional IP routing using the destination IP address within packet P to forward the packet to access node AE2.

In the embodiment of FIG. 2, segment ID stack 224 becomes smaller as packet P is routed through network 200, because segment identifiers are removed from the stack as the corresponding portions of the segment path are completed. This removal of segment identifiers is consistent with, for example, an implementation using the MPLS data plane. In an embodiment, the SR Continue instruction is implemented in the MPLS data plane by an MPLS swap operation having the incoming label value equal to the outgoing label value. The SR Next instruction is implemented as an MPLS pop operation. Such a segment routing implementation using the MPLS data plane may advantageously provide an implementation without the use of Label Distribution Protocol (LDP). In certain cases, for example, the MPLS configuration of using LDP for distribution of labels and IGP for distribution of network topology information can lead to errors because of differences in the time needed for LDP and IGP to respond to network disruptions. By using IGP for distribution of both segment identifiers and network topology information, segment routing may reduce the potential for error in the event of network disruptions.

In an alternative embodiment to that of FIG. 2, the stack of segment IDs attached to a packet remains unchanged as the packet is forwarded along the segment path. In such an embodiment, a pointer, or some other information is used to identify an active segment ID in the segment ID stack. The pointer can be advanced or incremented as the packet is forwarded along the segment path. This type of implementation may be particularly suitable, for example, to applying segment routing to an IPv6 network. In an embodiment, a segment ID stack and pointer field can be included within an IPv6 extension header.

Forwarding table 240 in FIG. 2 includes a stack instruction mapped to each segment identifier, as discussed above. In an alternative embodiment, stack instructions could be determined on-the-fly by a forwarding engine in each node rather than being included in SR forwarding tables. In one embodiment, a method for determining whether to retain or remove a segment identifier includes determining whether the top segment ID in the segment ID stack of a received packet is the nodal segment ID of the receiving node. If so, the nodal segment ID is removed from the stack (or in an implementation using a pointer, the pointer identifying the active segment ID is incremented). If there is no new top segment ID (i.e., the removed segment ID was at the bottom of the segment ID stack) the packet P has arrived at the egress edge node of the SR network, and further routing is done using the routing mechanism (such as IP routing) of the external network. If a new top segment ID is exposed, or if the original top segment ID does not match the nodal segment ID of the receiving node, the forwarding engine accesses the node's SR forwarding table to read the egress interface that is mapped to the top segment ID. When forwarding the packet to the mapped egress interface, the segment ID is either removed if it is an adjacency segment ID or retained if it is a nodal segment ID. In an embodiment, the forwarding engine determines whether the segment ID is an adjacency segment ID by comparing it to a designated range of adjacency segment IDs available for assignment within the network. In an alternative embodiment, the determination involves checking a routing table or segment routing database. In an alternative embodiment of stack instructions for nodal segment identifiers, the nodal segment identifier could be removed by the node immediately before the node that the nodal segment identifier is assigned to, in analogy to "penultimate-hop popping" of MPLS labels.

Topological segment identifiers such as nodal segment identifiers and adjacency segment identifiers encode sub-paths that can be used as building blocks to create any path through a SR-enabled network. This is a particularly useful capability in constructing explicit paths for testing purposes, as done in certain Operations, Administration and Maintenance (OAM) procedures.

Path Monitoring with Segment Routing

As size and utilization of networks increase, performance monitoring and maintenance become increasingly important. Various types of test packets and probes are used for monitoring and testing in IP networks. This disclosure describes methods and systems for routing such packets or probes over explicit paths in a network using segment routing techniques, and for using this explicit path capability to isolate a fault in the network.

In some embodiments, the methods and systems described herein are used with various test packet or probe configurations, and/or with testing protocols such as ping or traceroute. In particular, the explicit path routing described herein may in some embodiments be combined with methods and systems for recording the explicit route, either the intended route or the actual route (if different—for example, in the event of a network change or failure). For example, the IPv6 implementation of segment routing discussed above carries the entire segment ID stack of an intended route in an extension header, with a pointer used to indicate the active segment. In this way, the intended route of a test packet is recorded. In an implementation of segment routing using the MPLS data plane as described above, the intended path is not retained by the segment ID stack because the top segment ID in the stack is removed as the corresponding network sub-path is traversed.

In certain embodiments, mechanisms other than the segment ID stack may provide for recording of an explicit path. In one such embodiment, a metadata field inserted between the bottom of a segment identifier stack (or MPLS label stack) and the payload of a packet. Such a metadata field may be signaled using a special type of label or segment ID. In an embodiment, the signaling label or segment ID is not involved in routing of the packet. In some embodiments, such a metadata field includes a copy of the list of segment identifiers defining the intended path. In a further embodiment, information could be inserted into the metadata field in the course of packet routing to reflect the actual path taken by the packet. In another embodiment of an IPv6 implementation, an IPv6 extension header is used to collect IP addresses of nodes in the actual path of a packet. The methods and systems described herein can in some embodiments be combined with these or other methods of recording an explicit path.

Figures 3A, 3B, 3C:
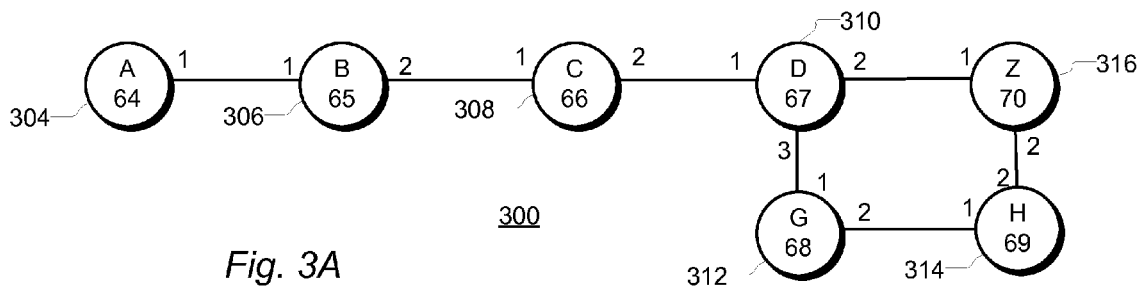

A portion 300 of an SR enabled network is shown in FIG. 3A. Nodes 304-316 of network portion 300 are assigned unique nodal segment IDs 64-70, respectively. Each of the nodes 304-316 is assigned a node prefix, or loopback, that is unique within network portion 300. Node prefixes A-D are provided for nodes 304-310, respectively, node prefixes G-H are provided for nodes 312-314 respectively, and node prefix Z is provided for node 316. Each of the nodes 304-316 has interfaces that are identified as shown. For example, node 310 has three interfaces designated 1-3, respectively.

In addition to the nodal segment IDs assigned to each of nodes 304-316, each node may also assign one or more adjacency segment IDs. A portion 320 of an SR routing table relating adjacency segment IDs to node loopbacks in network portion 300 is shown in FIG. 3B. In an embodiment, SR routing table portion 320 is generated by an SR routing engine in each of nodes 304-316 using information received in IGP advertisements sent by the other nodes in network portion 300. In an embodiment, the network nodes first receive advertisements identifying the nodes in the network and how the nodes are interconnected, and then advertise and receive advertisements of segment identifiers associated with the nodes. "SR routing table" as used herein refers to a data structure relating segment identifiers to network topology information, such as network nodes and the links between them. The routing table is created by and used by the control plane of a node. In an embodiment, the SR routing table is within a link state database formed using advertisements over IGP link state protocols having SR extensions. "SR forwarding table" as used herein refers to a data structure for a given node relating segment identifiers to respective egress interfaces of the node for forwarding of a packet, as in table 240 of FIG. 2. A forwarding table is created by the control plane of a node for use by the data plane. Each of these tables may alternatively take the form of a database or some other data structure. In an embodiment, the SR forwarding table and SR routing table may be combined into a single database or other data structure at a node.

In the embodiment of FIG. 3B, SR routing table portion 320 includes an adjacency source node and an adjacency destination node for each listed adjacency segment ID. The source node and destination node reflect the direction of travel of a packet routed using the corresponding adjacency segment ID. For example, segment ID 891 is assigned by node 304 (having loopback A) to the link between node 304 and node 306. Segment ID 891 should also appear in an SR forwarding table for node 304 (not shown) mapping segment ID 891 to egress interface 1 of node 304. Segment ID 562, by contrast, is assigned by node 306 to a link between the same two nodes, but in the other direction. Segment ID 562 should also appear in an SR forwarding table for node 306 (not shown) mapping segment ID 562 to egress interface 1 of node 306.

SR routing table portion 320 further includes information on whether the link corresponding to each of the adjacency segments is "protected." A protected adjacency link is one for which a backup path has been calculated and associated with the adjacency segment ID, so that in the event of a failure of the primary link associated with the segment ID, a packet can be routed along the backup path. In an embodiment, protection information is advertised among nodes using an extension to an IGP protocol such as IS-IS or OSPF. In a further embodiment, protection of a link is communicated by setting of a flag within an IGP protocol or an extension to such a protocol. In such an embodiment, the flag may be a backup flag, and the backup path may further be advertised using an IGP protocol or extension thereof. In a further embodiment, the backup path is included in an entry for the protected link in an SR routing table. For example, in the case of segment ID 884 for protected link DZ, a backup path can be designated along links DG, GH, and HZ. In an embodiment, the SR routing table containing portion 320 also includes entries associating adjacency segment IDs with these links, and the entry for protected link DZ includes the designated backup path.

Protected links are clearly advantageous for routing purposes, making it more likely that a packet will reach its destination despite link failures. Protected links may make isolation of a failed link more difficult, however. In an embodiment of an SR-enabled network, an adjacency link is represented by at least two adjacency segment IDs: one associated with an instruction that the link is to be protected with a backup path, and another associated with an instruction that the link is not to be protected (or a lack of instruction to protect the link). Links DZ and ZD in routing table portion 320 illustrate this practice. In an embodiment, if a segment path includes an unprotected link and that link fails, a packet routed to the failed link is dropped. In some embodiments of methods described herein for isolating a failed link, segment paths are formed using adjacency segment IDs corresponding to unprotected adjacency links. Network testing may in some embodiments be done using protected adjacency links, however. For example, connectivity testing using protected links can identify situations in which both primary and backup links have failed. Moreover, in embodiments for which the actual path taken by a test packet is recorded (for example, in one of the ways discussed above) a failed primary link may be identified upon the return of a test packet showing that the backup path was taken.

In a further embodiment relating to protection of adjacency links, an adjacency segment identifier can be defined to invoke testing of the designated backup path for a working link. In an embodiment, such a segment ID can be implemented as a service segment ID associated with an adjacency link. In general, a segment ID can identify a topological instruction (such as a path segment) or a service instruction. A service segment ID identifies a service performed by a node, such as deep packet inspection or packet filtering. In an embodiment, a service identified by a service segment ID is performed prior to forwarding of the packet carrying the service segment ID to the next node on the segment path. In a further embodiment, the service segment ID is placed in a segment ID stack below the segment ID that brings the packet to the node performing the service, and above the segment ID that takes the packet away from the node performing the service. In such an embodiment, a stack instruction associated with the service segment ID is Next, so that the service segment ID is removed when the service is completed, and the underlying segment ID in the stack is then used for forwarding of the packet to the next node on the segment path. In such an embodiment, the service segment ID is not mapped to an egress interface in a forwarding table such as table 240 of FIG. 2.

In an embodiment for defining an adjacency segment identifier to invoke testing of the designated backup path for a working link, a link such as link DZ of FIG. 3A could have an additional segment ID associated with it in routing table portion 320 of FIG. 3B. In addition to entries for adjacency segment IDs 894 and 884, link DZ could have another entry (not shown) for a third segment identifier. This additional segment ID is a service segment ID mapping link DZ with an instruction to assume, for purposes of the packet carrying the service segment ID, that the link DZ has failed. The service segment ID therefore puts node D into the state, for that packet, of considering DZ to be a failed link. In the embodiment of FIG. 3B, what happens when routing a packet to node Z depends on the nature of the adjacency statement following the service segment ID. In order to test the backup bath, the segment ID below the service segment ID in the stack should be segment ID 884 for the protected DZ link. Node D, assuming that link DZ has failed, will then implement the backup path mapped to the protected segment. Use of this service segment ID followed by the protected segment ID therefore is a way of testing whether the node properly implements the backup path and whether the backup path is working.

FIG. 3C illustrates a series of segment ID stacks used in an embodiment of a method for isolating a failed link in a network. In an embodiment, the segment ID stacks of FIG. 3C are generated by a path monitoring system in the network. The path monitoring system is in some embodiments implemented as a path monitoring module within a network node. In a further embodiment, the path monitoring module is an ingress or egress node of the SR network. In other embodiments the path monitoring system is implemented in a network device, such as a network controller, in data communication with a network node. The path monitoring system accesses routing data such as that in routing table portion 320 to generate segment ID stacks encoding network paths of interest. In the embodiment of FIG. 3C, the path monitoring system is in data communication with node 304, and creates segment ID stacks to encode test paths starting and ending at this node.

In the embodiment of FIG. 3C, a path monitoring system first generates segment ID stack 1. This stack encodes a path from node 304 through nodes 306, 308, and 310 to node 316, using segment IDs 891, 892, 893 and 894. The path then returns from node 316 through nodes 310, 308 and 306 to node 304, as encoded by segment IDs 565, 564, 563 and 562. In the embodiment of FIG. 3C, the segment paths are encoded using non-protected links. Segment ID stack 1 may be inserted into a header of a test message, or packet, for routing of the message through network 300. How the segment ID stack is inserted specifically depends upon the data plane implementation of the network. In an IPv6 implementation, for example, the segment ID stack is included in an extension header between the IP header and the payload of the test packet. In an MPLS implementation, the segment ID stack is instantiated as an MPLS label stack and included in a header between the data link layer header and the IP header of the test packet. Whatever the data plane implementation, the segment ID stack is attached to the test message in a manner allowing the stack to be accessed by an SR forwarding engine.

Segment ID Stack 1 may be used to route a test packet along its encoded path as part of a path monitoring procedure. In some embodiments, a test packet may be sent repeatedly along the path in a continuous fashion, to provide continuous monitoring. In other embodiments, the path may be monitored at intervals, or only when there is a suspected fault. If a test packet routed using segment ID stack 1 fails to return, additional segment ID stacks are used to isolate the location of a failure on the path. Segment ID stack 2 encodes a path from node 304 to node 310 and back, leaving out links DZ and ZD from the path of segment ID stack 1. If a test packet routed using segment ID stack 2 returns successfully, the failure is between nodes 310 and 316. If the test packet routed with segment ID stack 2 also fails to return, a test packet is routed using segment ID stack 3, which encodes a path from node 304 to node 308 and back. Successful return of the packet routed using segment ID stack 3 indicates a failure between node 308 and 310. If the test packet routed using segment ID stack 3 fails to return, the method of FIG. 3C continues with encoding of the next shortest path using segment ID stack 4. Successful return of a test packet routed using segment ID stack 4 indicates a failure between nodes 306 and 308, while a failure of such a test packet to return indicates a failure between nodes 304 and 306. In alternate embodiments, test packets routed using segment ID stacks 2, 3 and 4 can of course be sent in a different order, such as reverse order. In another alternate embodiment, test packets encoded with using segment ID stacks 2, 3 and 4 are sent in rapid succession, without waiting to determine whether one packet returns before sending another.

FIG. 3D illustrates two additional segment identifier stacks that may be employed in an embodiment of a method for determining the direction of a link failure. In the embodiment of FIG. 3D, it is assumed that a method such as that described above with reference to FIG. 3C has detected a failure between nodes 308 and 310 of network portion 300 of FIG. 3A. Because this method of isolating the failed link involves traversing each link in both directions, it is not known which direction(s) of the link exhibit the failure. In other words, the failed link could be CD, or DC, or both. Segment ID stacks 5 and 6 of FIG. 3D make use of nodal segment IDs to probe each direction separately. A test packet routed using segment ID stack 5 is first routed to node 310 using nodal segment ID 67, then to nodes 308, 306 and 304 using adjacency segment IDs 564, 563 and 562. This test packet therefore attempts to traverse link DC on its path back to node 304. A test packet routed using segment ID stack 6 is routed from node 304 through nodes 306 and 308 to node 310, using adjacency segment IDs 891, 892 and 893, and then back to node 304 through nodal segment ID 64.

A key point in understanding the use of nodal segment IDs in segment ID stacks 5 and 6 of FIG. 3D is that a nodal segment ID encodes the shortest available path to a node. That path is calculated by the routing engine of a node based on IGP advertisements from other nodes, and updated in the event of network changes. Use of a nodal segment ID therefore ensures that a routed packet will get to the identified node somehow (barring an exceptional event such as removal of the node itself from the network, or an aggregation of failures so large that methods of identifying a particular failed link are of little applicability). In the embodiment of FIG. 3D, it should also be understood that FIG. 3A illustrates a portion 300 of a network, such that the entire network includes additional paths to each node not shown in FIG. 3A. In a typical network situation, therefore, nodal segment ID 67 of segment stack 5 will get a test packet to node 310 of network portion 300. Adjacency segment 564, on the other hand, is associated with unprotected adjacency link DC. If link DC has failed, a test packet routed using segment stack 5 will not return successfully. Similarly, nodal segment ID 64 of segment stack 6 will return a test packet to node 304 if the packet arrives at node 310 through adjacency segment ID 893, the previous ID in the stack. If the link CD associated with adjacency segment ID 893 has failed, a test packet routed using segment stack 6 will not return successfully.

The capability of rapidly reaching any node in a SR-enabled network by using a nodal segment identifier can be extremely useful in monitoring paths within the network, particularly when the path of interest is remote from the path monitoring system. A nodal segment identifier can be used to get a test packet to the beginning of the path of interest, followed by adjacency segment IDs to traverse the explicit path to be monitored. Another nodal segment ID may then be used to get the packet quickly back to the monitoring system.

FIG. 4A illustrates a portion 400 of another embodiment of a segment routing enabled network. Nodes 404-410 of network portion 400 are assigned unique nodal segment IDs 64-67, respectively, and nodes 412 and 414 are assigned nodal segment IDs 70 and 71, respectively. Node prefixes A-D are provided for nodes 404-410, respectively, node prefix E is provided for node 414, and node prefix Z is provided for node 412. Each of the nodes 404-412 has interfaces that are identified as shown. For example, node 410 has three interfaces designated 1-3, respectively. Network portion 400 includes two paths between node 404 and node 412: one through node 408 and the other through node 414. In an embodiment, these two paths are established as having equal cost through IGP advertisements by the nodes of network portion 400, so that an ECMP load-balancing algorithm routes network traffic between node 404 and node 412 equally between the two paths. A monitoring system in data communication with node 404 could attempt to monitor the path to node 412 using nodal segment ID 70, for node 404, attached to a test message. Because of the two equal-length paths to node 412, however, it would not be known which path the test message would take.

FIG. 4B illustrates a pair of segment identifier stacks that can be used to separately monitor each of the paths in network portion 400 from a monitoring system in data communication with node 404. Segment identifier stack 1 includes nodal segment identifier 66, encoding a path to node 408, followed by nodal segment identifier 70, encoding a path from node 408 to node 412. Because the shortest path to node 408 from node 404 is through nodes 404, 406 and 408, a test packet routed using nodal segment ID 66 will travel that path in the absence of a broken link in the network. Similarly, segment ID stack 2, including nodal segment ID 71 and nodal segment ID 70, will cause a test packet to be routed along the lower path through nodes 404, 406, 414, 410 and 412.

As noted above, it is unlikely that a test packet routed using a nodal segment identifier would be dropped in the event of a broken link in the network. Instead, the packet would be routed to the destination node using an alternate path (the new shortest path to the node). Nodal segment IDs may therefore be less useful than adjacency segment IDs for generating test paths to isolate actual broken links. Other testing and monitoring functions, such as monitoring latency, may be more readily carried out using nodal segment IDs. In some embodiments, however, a broken link or other network fault may be inferred from data obtained by routing a test packet using a nodal segment. For example, in an embodiment for which the actual path taken by a test packet is recorded, a comparison of the expected path to the destination node to the actual path may indicate a problem with the intended path. Alternatively or in addition, a longer-than-expected transit time for a packet routed using a nodal segment may indicate that the packet traveled by a particularly circuitous route, again indicating a problem with the expected shortest path to the node. The segment ID stacks of FIG. 4C illustrate a sequence of test packets similar to that of FIG. 3C, except that nodal segment identifiers are used. Segment stack 1 of FIG. 4C encodes a path from node 404 to node 412 and back using the upper path through node 408. Segment stack 2 encodes a path from node 404 to node 408 and back. In certain embodiments test paths encoded using these segment ID stacks may indicate a problem in either the first part of the upper path (through nodes 404, 406 and 408) or the second part of the upper path.

FIG. 4D illustrates segment ID stacks that may be used to route test packets in order to isolate a problem in the first part of the upper path of network portion 400. In an embodiment for which a fault such as a broken link is suspected in the path from node 404 to node 408 that nodal segment ID 66 is expected to encode, segment ID stacks such as those of FIG. 4D containing adjacency segment IDs may be useful in isolating the fault. The embodiment of FIG. 4D uses the same adjacency segment IDs for nodes 404 through 408 as are shown in routing table portion 320 of FIG. 3B for nodes 304 through 308 of the network of FIG. 3A. Segment ID stack 3 includes adjacency segment IDs encoding a path from node 404 to node 408 and back, while segment ID stack 4 includes adjacency segment IDs encoding the path from node 404 to node 406 and back. If a test packet routed using one of these segment stacks fails to return or otherwise indicates degraded network performance, the faulty link can be isolated in the manner described above in the discussion of FIG. 3C.

FIG. 5A illustrates an example of a system and method for probing the links within a bundle between two routers remote from a monitoring system. Unlike any of the nodes in the networks shown in FIGS. 2, 3A and 4A, SR-enabled routers 506 and 508 in FIG. 5A have multiple links between them. Links L1, L2 and L3 form a bundle between the two routers. The links connect to separate interfaces labeled 1, 2, and 3 on each router. Router 508 is assigned nodal segment ID 72. Monitoring system 502 is separated from routers 506 and 508 by network portion 504. Monitoring system 502 is either associated with or in data connection with a network node, and has access to segment identifier information such as that in SR routing table portion 510 of FIG. 5B.

In the embodiment of FIG. 3B, SR routing table portion 510 maps an adjacency segment identifier to each direction of each of the three links between routers 506 and 508. Monitoring system 502 uses this segment identifier information to create a segment ID stack for attachment to a test packet. In an embodiment the test packet is an IP probe having as its source and destination address the IP address of the monitoring system.

An example of a portion 520 of an SR forwarding table for node 506 is shown in FIG. 5C. Forwarding table portion 520 maps the adjacency segment IDs for each of the links from router 506 to router 508 to its respective egress interface at router 506. Each of the adjacency segment identifiers is also mapped to a Next stack instruction, so that the adjacency segment identifier is removed (or the segment ID stack's pointer is moved to the next segment ID) when a packet is forwarded over the corresponding adjacency link. Nodal segment ID 72 is mapped to all three of the egress interfaces of router 506. Assuming the three links are of equal length and configured to be of equal cost, traffic routed using nodal segment ID 72 can travel over any of the links, and is likely spread between all of them by an ECMP load-balancing algorithm. In the embodiment of FIG. 5C, nodal segment ID 72 is associated with a Continue stack instruction in SR forwarding table portion 520.

FIG. 5D illustrates an example of a segment ID stack 530 created by monitoring system 502 for attachment to a test packet. In an embodiment in which monitoring system 502 is connected to a non-SR-enabled portion of the network, a suitable tunneling mechanism is used to get the segment ID stack to the edge of the SR-enabled portion of the network that contains routers 506 and 508. In the SR-enabled network portion, the probe packet is routed to router 508 as encoded by nodal segment ID 72 at the top of stack 530. Router 508, using a SR forwarding table similar to table portion 520 for router 506, forwards the probe over link L1 to router 506, as encoded by adjacency segment identifier 662. Router 506 then forwards the probe over link L2 back to router 508, as encoded by adjacency segment identifier 992. Router 508 then forwards the probe over link L3 back to router 506, as encoded by adjacency segment identifier 664. At this point all of the segment identifiers in the stack have been removed (or made inactive by incrementing of a pointer). In an embodiment, router 506 then uses traditional IP forwarding to send the probe back to the monitoring system. In a further embodiment, additional adjacency segment IDs are added to a segment ID stack attached to a test probe, so that both directions of the links may be monitored.

Figure 6A:
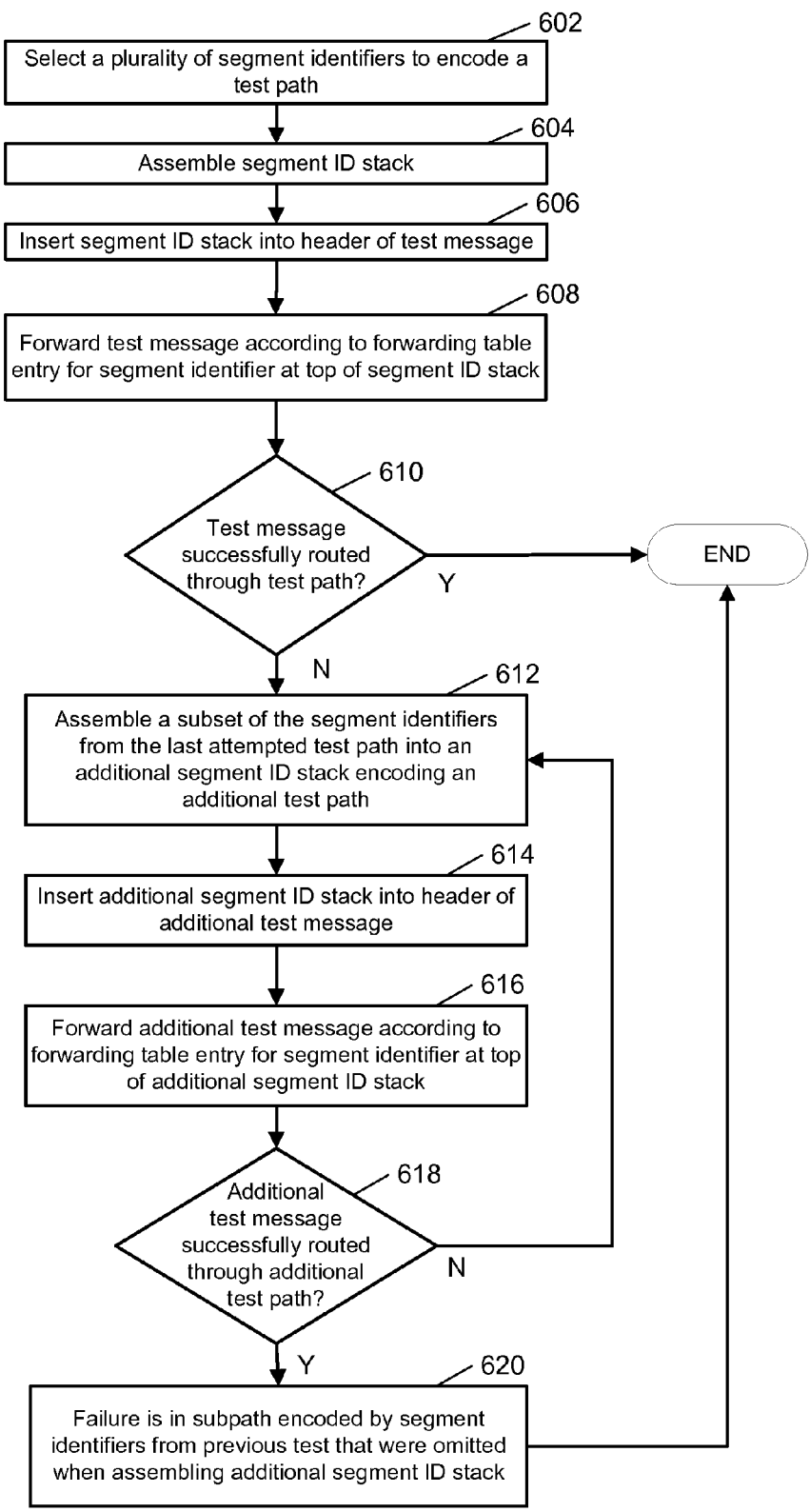
FIGS. 6A-6C are flowcharts illustrating exemplary processes for monitoring a network path.

The flowchart of FIG. 6A illustrates an example of a method for monitoring a test path. A method such as that of FIG. 6A may be carried out by a path monitoring system associated with or in data communication with an SR-enabled network node. The method begins in step 602 with selecting a plurality of segment identifiers to encode a test path. In an embodiment, this selection includes accessing a data structure relating network topology information with the plurality of segment identifiers. SR routing table portions 320 of FIGS. 3B and 510 of FIG. 5B are examples of such a data structure.

The segment identifiers are assembled into a segment ID stack (step 604), which is then inserted into a header of a test message (step 606). As discussed further above, the particular way the segment ID stack is inserted into the header depends on the data plane implementation of the SR-enabled network. The test message is then forwarded according to a forwarding table entry for the segment identifier at the top of the segment identifier stack (step 608).

If the test message is successfully routed through the test path encoded by the segment ID stack (Y branch of decision 610), the method of FIG. 6A ends. In a further embodiment, sending of the test message to monitor the test path is repeated at intervals. In another embodiment, test messages carrying the segment ID stack are sent continuously.

In an embodiment, successful routing of the test message through the test path means that the test message reaches the final node of the test path. In an alternate embodiment, successful routing of the test message includes obtaining values within an expected range of one or more network metrics, such as latency. In another embodiment, successful routing of the test message includes a match between the expected test path and a path actually taken by the packet. If the test message is not successfully routed through the test path (N branch of decision 610), the method of FIG. 6A continues with a process for isolating the faulty portion of the test path. This process begins in step 612 with assembling a subset of the segment identifiers from the last attempted test path into an additional segment ID stack encoding an additional test path. Because only a subset of the segment identifiers from the previous test path is used, the additional test path is shorter than the previous test path. The additional segment ID stack is inserted into a header of a test message and the test message is forwarded according to a forwarding table entry for the top segment identifier on the segment ID stack (steps 614 and 616). Successful routing of the additional test message indicates that the fault in the original test path is in the portion of the original test path left out of the additional test path (steps 618 and 620). Unsuccessful routing of the additional test message (N branch of decision 618) causes the process to be repeated with a still-shorter test path. The method of steps 612 through 620 is similar to that described in the discussion of FIG. 3C above, and is subject to at least the same variations and alternative embodiments as discussed with regard to that example.

Figure 6B:
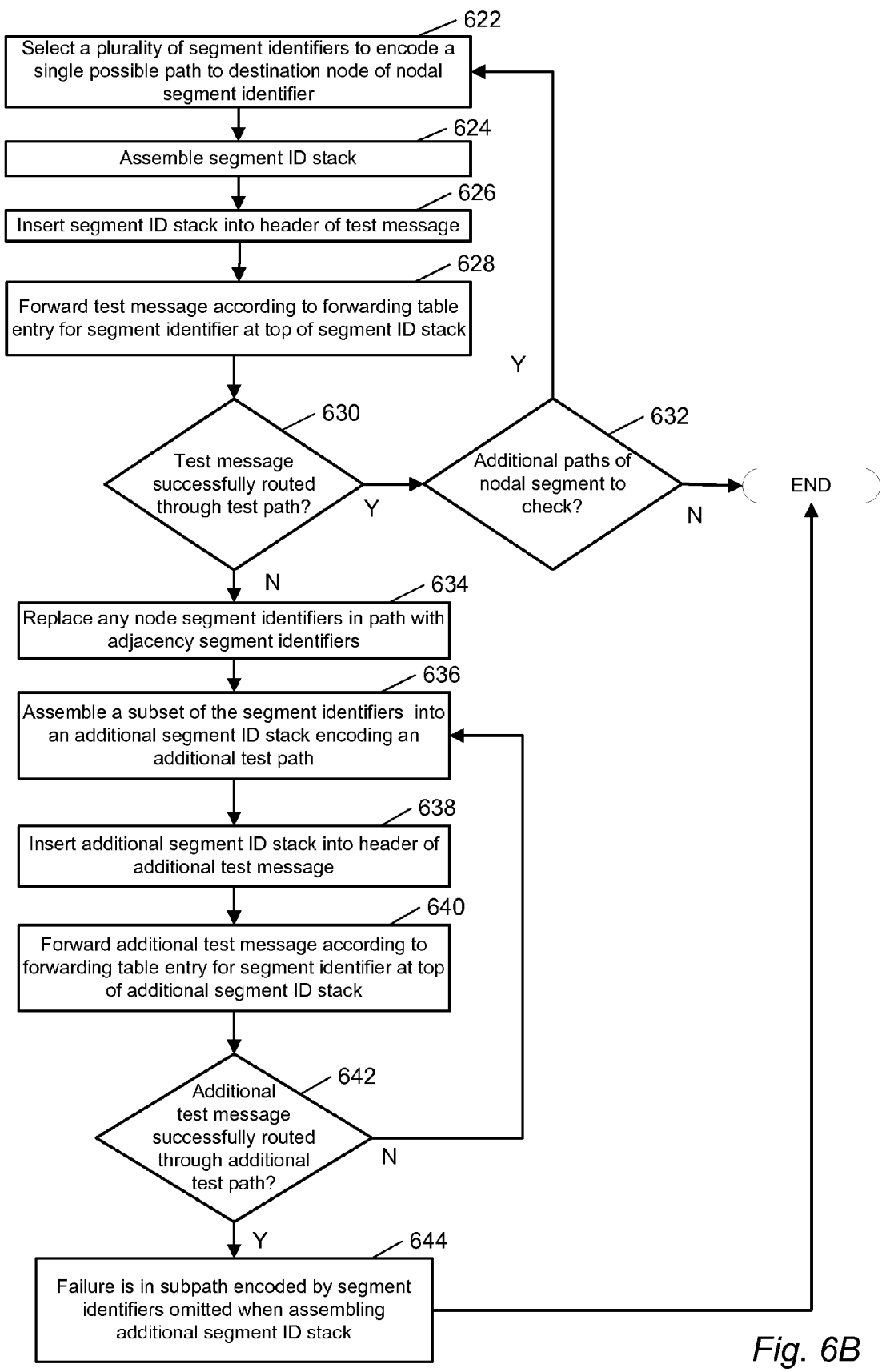

FIG. 6B is a flowchart illustrating a method for monitoring a path encoded by a nodal segment identifier. As noted above in the discussion of FIGS. 4A-4D, the path encoded by a nodal segment identifier may be subject to load balancing and adjustments due to network changes. The method of FIG. 6B begins in step 622 with selecting a plurality of segment identifiers to encode a single possible path to the destination node of a nodal segment identifier. As discussed above in connection with FIG. 6A, this selection includes accessing a data structure relating network topology information with the plurality of segment identifiers, such as an SR routing table or a link state database built using SR extensions to an IGP protocol. In an embodiment, segment identifiers to encode a single path include a nodal segment identifier corresponding to a node partway along the test path, such that there is a single shortest path to the node associated with the nodal segment identifier, and that shortest path forms a portion of the test path. In an alternative embodiment, segment identifiers to encode a single path include adjacency segment identifiers to explicitly specify the test path. The method continues with assembling the segment ID stack, inserting the stack into a header of a test message and forwarding the test message (steps 624-628), all in a similar manner as described for FIG. 6A above.

If the test message is successfully routed through the test path encoded by the segment ID stack (Y branch of decision 630), the process of steps 622-628 is repeated for any additional paths possibly encoded by the nodal segment identifier. If test packets are routed successfully over each of the possible paths to the destination node, the method of FIG. 6B ends. In a further embodiment, sending of test messages to monitor the possible paths to the destination node is repeated at intervals. In another embodiment, segment-routed test messages are sent continuously along each of the possible paths encoded by the nodal segment identifier.

Particularly in embodiments for which the individual test paths corresponding to a nodal segment identifier are encoded using shorter nodal segment identifiers, a network fault is unlikely to result in non-return of a test packet. In an embodiment, successful routing through the test path includes obtaining values within an expected range of one or more network metrics, such as latency. For example, if the time taken to traverse a test path including nodal segment identifiers is much longer than expected, a fault in the expected path resulting in a particularly circuitous route may be indicated. In an embodiment, successful routing of the test message includes a match between the expected test path and a path actually taken by the packet.

If the test message is not successfully routed through one of the individual test paths (N branch of decision 630), the method of FIG. 6B continues with a process for isolating the faulty portion of the test path. In the embodiment of FIG. 6B, this process begins at step 634 by replacing any nodal segment identifiers in the test path having a suspected fault with adjacency segment identifiers. At least in the case of a broken network link, use of adjacency segment IDs simplifies the process of isolating the fault. In an alternate embodiment, replacement of nodal segment IDs with adjacency segment IDs could be delayed until the fault is isolated to a smaller portion of the test path. Once the path to be tested further is encoded using adjacency segment identifiers, the process of isolating a fault goes forward in the manner described above for steps 612-620 of FIG. 6A.

Figure 6C:
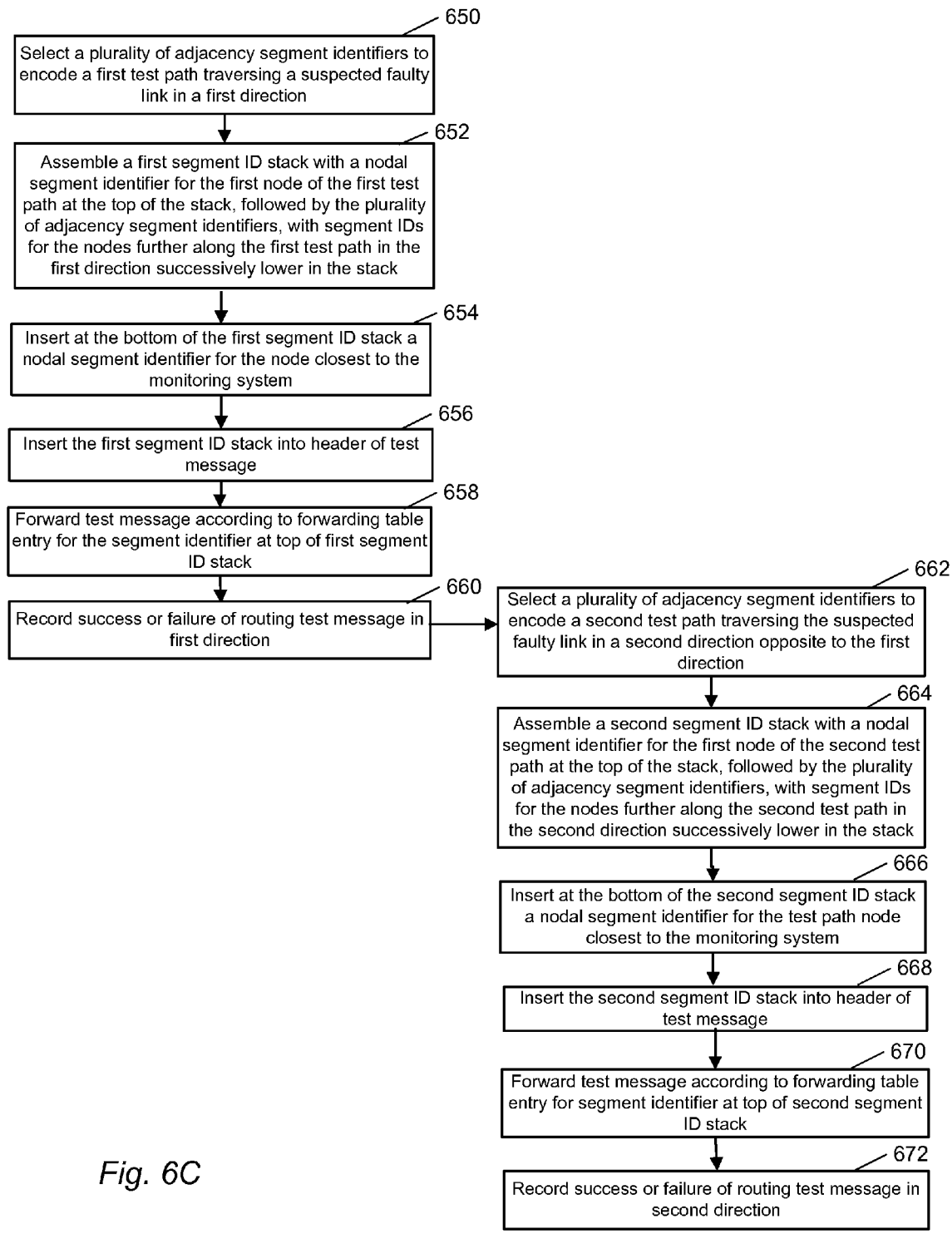

FIG. 6C is a flowchart illustrating an example of a method for determining the direction of a suspected faulty link. The process of FIG. 6C is similar to that described with reference to FIG. 3D, except that in FIG. 6C a nodal segment identifier is employed at the top of a segment ID stack, in order to rapidly move the test message to the beginning of the test path. This feature of the embodiment of FIG. 6C may be particularly useful in situations where the path to be monitored or tested is remote from the monitoring system. The method begins in step 650 with selecting a plurality of adjacency segment identifiers to encode a first test path traversing a suspected faulty link in a first direction. The segment identifiers are selected through accessing of a data structure relating the segment identifiers to the network topology, as discussed above with reference to FIGS. 6A and 6B.

The method of FIG. 6C continues in step 652 with assembly of a first segment ID stack having at the top of the stack a nodal segment identifier corresponding to the first node of the first test path. This top segment ID is followed by the plurality of adjacency segment IDs selected in step 650, where the adjacency segment IDs for the nodes further along the test path in the first direction are situated successively lower in the segment ID stack. An additional nodal segment identifier corresponding to the node closest to the path monitoring system is inserted at the bottom of the first segment ID stack (step 654). The complete segment ID stack is then inserted into a header of a test message, the test message is forwarded according to a forwarding table entry for the segment ID at the top of the segment ID stack, and the success or failure of routing the test message in the first direction is recorded (steps 656-660).

A similar procedure is then carried out for testing of the suspected faulty link in the other direction. The method continues in step 662 with selecting a plurality of adjacency segment identifiers to encode a second test path traversing the suspected faulty link in a second direction opposite to the first direction. A second segment ID stack is assembled having at the top of the stack a nodal segment identifier corresponding to the first node of the second test path (step 664). This top segment ID is followed by the plurality of adjacency segment IDs selected in step 662, where the adjacency segment IDs for the nodes further along the test path in the second direction are situated successively lower in the segment ID stack. An additional nodal segment identifier corresponding to the node closest to the path monitoring system is inserted at the bottom of the second segment ID stack (step 666). The complete segment ID stack is then inserted into a header of a test message, the test message is forwarded according to a forwarding table entry for the segment ID at the top of the segment ID stack, and the success or failure of routing the test message in the second direction is recorded (steps 668-672).

In the embodiment of FIG. 6C, if the test message routed along the first test path in the first direction fails, the faulty link has a failure in the first direction. Similarly, if the test message routed along the second test path in the second direction fails, the link is faulty in the second direction. Use of a nodal segment ID at the top of the segment ID stack allows the test packet to quickly reach the beginning of the test path. Use of a nodal segment ID at the bottom of the segment ID stack allows the test packet to be quickly returned to the path monitoring system after traversing the test path (if the path is successfully traversed). In an alternative embodiment, the test message can be returned to the monitoring system using IP routing, if the test message is in the form of an IP packet including the IP address of the monitoring system as its source and destination address.

Figure 7A:
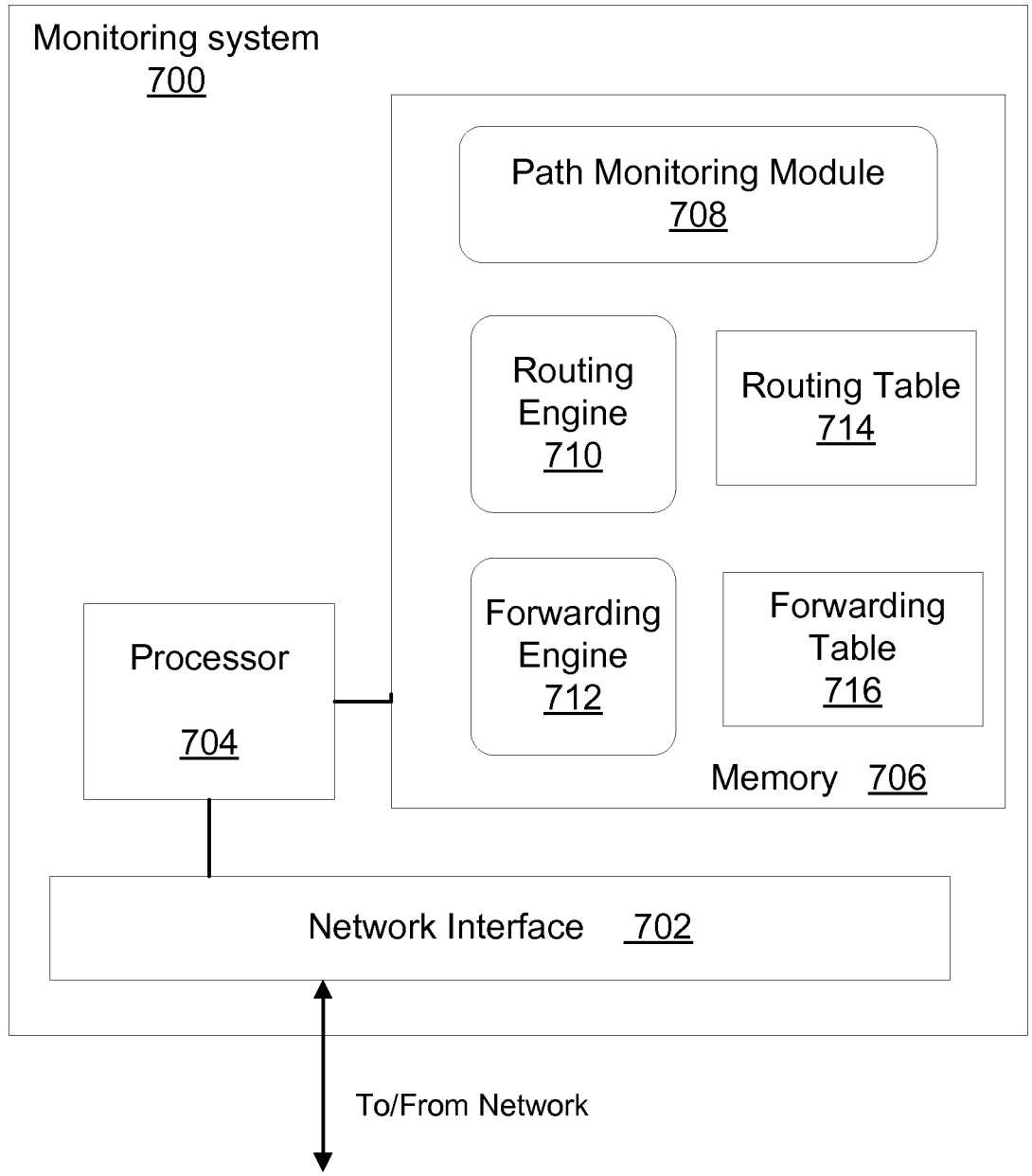
FIG. 7A is a block diagram of an exemplary monitoring system.

FIG. 7A is a block diagram of an exemplary embodiment of a path monitoring system that may perform methods as described herein. In the embodiment of FIG. 7A, monitoring system 700 is combined with a network node and has forwarding and routing capabilities similar to those of a network node. Monitoring system 700 includes network interface 702 for connection to one or more networks. Network interface 702 contains the mechanical, electrical and signaling circuitry for communicating data over physical links coupled to a network such as network 100 of FIG. 1 or the networks of FIGS. 2, 3A, 4A and 5A. Network interface 702 may be configured to transmit and/or receive data using a variety of protocols and protocol suites, including MPLS, GMPLS, TCP/IP, SONET/SDH, Ethernet, OTN, and so forth. Network interface 702 may also be used to implement one or more virtual network interfaces, such as for Virtual Private Network (VPN) access. Network interface 702 is coupled to processor 704 and may also be coupled to memory 706 of apparatus 700.

Memory 706 includes a plurality of storage locations addressable by processor 704 and network interface 702 for storing software programs and data structures associated with the methods described herein. In the embodiment of FIG. 7A, memory 706 includes routing engine 710. Routing engine 710 includes computer executable instructions that when executed by processor 704 are operable to receive network information and generate a data structure such as routing table 714 to relate segment identifiers to the topology of the network. Routing engine 710 further includes computer executable instructions operable to generate a forwarding table such as forwarding table 716 relating segment identifiers to respective egress interfaces for forwarding packets or messages. In an embodiment, forwarding table 716 further relates segment identifiers to respective stack instructions indicating whether a segment identifier is to be removed or retained when forwarding a packet. Memory 706 further includes forwarding engine 712. Forwarding engine 712 includes computer executable instructions that when executed by processor 704 are operable to read the top segment identifier in a segment ID stack attached to a packet or message, access a forwarding table such as forwarding table 716 to obtain forwarding instructions for the top segment identifier, and forward the packet or message according to the forwarding instructions.

Memory 706 also includes path monitoring module 708. Path monitoring module 708 includes computer executable instructions that when executed by processor 704 are operable to perform operations including accessing segment identifier information from a data structure such as routing table 714, selecting segment identifiers to encode a particular test path, creating a segment ID stack, and inserting a segment ID stack into a header of a test packet or message. In an embodiment, path monitoring module 708 interacts with forwarding engine 712 to implement forwarding of a test packet according to a segment ID stack in a header of the test packet.

Figure 7B:
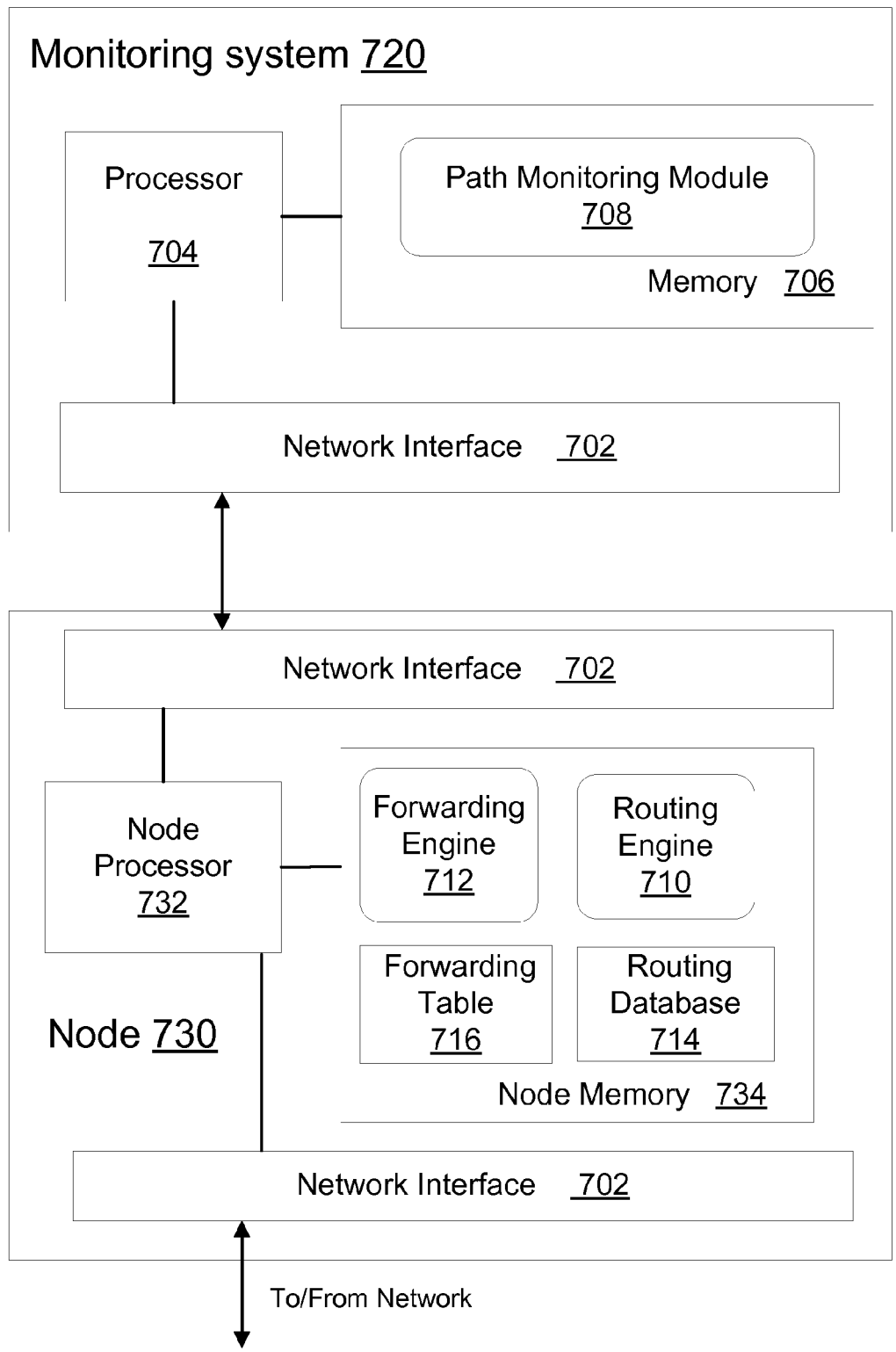
FIG. 7B is a block diagram of an alternative embodiment of an exemplary monitoring system.

An alternative embodiment of a monitoring system is illustrated by the block diagram of FIG. 7B. In the embodiment of FIG. 7B, monitoring system 720 is in communication with a network node 730, but not integrated with the node. In the embodiment of FIG. 7B, the routing and forwarding functions and tables are stored in node memory 734 of node 730. Path monitoring module 708 in monitoring system 720 can access segment identifier information and packet forwarding functionality through processor 704 and the respective network interfaces 702 of monitoring system 720 and node 730.

Figure 8:
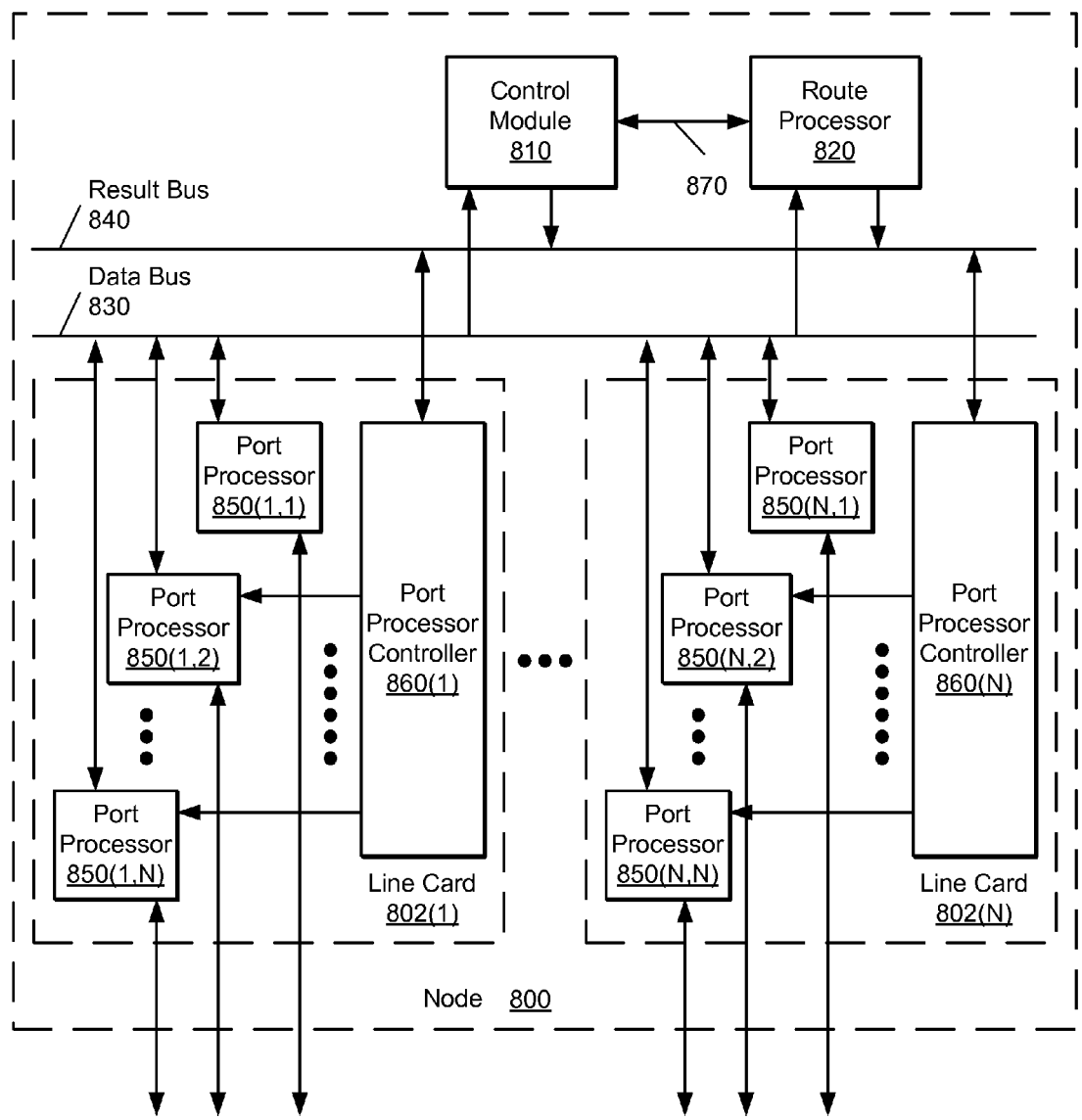
FIG. 8 is a block diagram of an embodiment of a node that may be employed in a network as described herein.

FIG. 8 is a block diagram of an embodiment of a node 800 that may be employed in the networks described herein. In this depiction, network device 800 includes a number of line cards (line cards 802(1)-802(N)) that are communicatively coupled to a control module 810 (which can include a forwarding engine, not shown) and a route processor 820 via a data bus 830 and a result bus 840. Line cards 802(1)-(N) include a number of port processors 850(1, 1)-850(N, N) which are controlled by port processor controllers 860(1)-860(N). It will also be noted that control module 810 and route processor 820 are not only coupled to one another via data bus 830 and result bus 840, but are also communicatively coupled to one another by a communications link 870. In alternative embodiments, each line card can include its own forwarding engine.

When a message or packet is received, the message is identified and analyzed by a node such as node 800 in the following manner Upon receipt, a message (or some or all of its control information) is sent from one of the port processors 850(1, 1)-850(N, N) at which the message was received to one or more of those devices coupled to data bus 830 (e.g., others of port processors 850(1, 1)-850(N, N), a forwarding engine, and/or route processor 800). Handling of the message can be determined, for example, by a forwarding engine. For example, a forwarding engine may determine that the message should be forwarded to one or more of port processors 850(1, 1)-850(N, N). This can be accomplished by indicating to corresponding one(s) of port processor controllers 860(1)-860(N) that the copy of the message held in the given one(s) of port processors 850(1, 1)-850(N, N) should be forwarded to the appropriate one of port processors 850(1, 1)-850(N, N). In this example, the segment routing enabled routing and forwarding functionality described above with respect to, for example, FIG. 2 can be implemented in control module 810 and/or route processor 820.

As will be appreciated in light of the present disclosure, processes according to concepts embodied by systems such as those described herein include one or more operations, which may be performed in any appropriate order. The operations referred to herein may be modules or portions of modules (e.g., software, firmware or hardware modules). For example, although the described embodiment includes software modules, the various example modules may be application specific hardware modules. The software modules discussed herein may include script, batch or other executable files, or combinations and/or portions of such files. The software modules may include a computer program or subroutines thereof encoded on computer-readable storage media.

Additionally, it will be apparent to those skilled in the art in light of the present disclosure that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize in light of the present disclosure that the operations described in example embodiments are for illustration only. Operations may be combined or the functionality of the operations may be distributed in additional operations in accordance with the methods and systems disclosed herein.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, it should be appreciated by those skilled in the art in view of the present disclosure that, unless otherwise indicated, modifications and variations described with respect to one embodiment are applicable to other similar embodiments.

What is claimed is:

1. A method, comprising:
   selecting a plurality of segment identifiers, wherein
      said selecting comprises accessing a data structure relating each of the segment identifiers to one or more nodes within a network, and
      interior gateway protocol (IGP) advertisements are used to communicate the segment identifiers for creation or updating of the data structure;
   assembling the plurality of segment identifiers into a segment identifier stack, wherein the segment identifier stack encodes a test path within the network for attempted routing of a test message;

inserting the segment identifier stack into a header associated with the test message; and forwarding the test message according to an entry in a forwarding table corresponding to a segment identifier at the top of the segment identifier stack, wherein IGP advertisements are used to communicate the segment identifier at the top of the segment identifier stack for creation or updating of the forwarding table.

2. The method of claim 1, further comprising determining whether the test message is routed through the entirety of the test path.

3. The method of claim 2, further comprising, in response to a determination that the test message is not routed through the entirety of the test path:

assembling a subset of the plurality of segment identifiers into an additional segment identifier stack, wherein the additional segment identifier stack encodes an additional test path for attempted routing of an additional test message, and wherein at least one link between adjacent nodes of the test path is not included in the additional test path;

inserting the additional segment identifier stack into a header associated with the additional test message;

forwarding the additional test message according to a forwarding table entry corresponding to a segment identifier at the top of the additional segment identifier stack; and determining whether the additional test message is routed through the entirety of the additional test path.

4. The method of claim 1, wherein:

the plurality of segment identifiers comprises an adjacency segment identifier; and the adjacency segment identifier is related by the data structure to a link between two adjacent nodes of the network.

5. The method of claim 4, wherein the adjacency segment identifier is associated with an instruction not to protect the link represented by the adjacency segment identifier with a backup path in the event of a failure of the link.

6. The method of claim 4, wherein the adjacency segment identifier is associated with an instruction that the link represented by the adjacency segment identifier has failed.

7. The method of claim 1, wherein:

the plurality of segment identifiers comprises a nodal segment identifier;

the nodal segment identifier is related by the data structure to a specific node of the network; and the nodal segment identifier represents a path through the network to the specific node.

8. The method of claim 7, wherein the nodal segment identifier represents the shortest available path through the network to the specific node.

9. The method of claim 7, wherein the nodal segment identifier is related by the data structure to an internet protocol (IP) loopback address of the specific node.

10. The method of claim 4, wherein:

the plurality of segment identifiers further comprises a nodal segment identifier;

the nodal segment identifier is related by the data structure to a specific node of the network; and the nodal segment identifier represents a path through the network to the specific node.

11. The method of claim 10, wherein said assembling comprises placing the nodal segment identifier at the top of the segment identifier stack and at least one adjacency segment identifier in a remainder of the segment identifier stack.

12. A monitoring system comprising:

one or more network interfaces adapted for data communication with one or more respective network nodes; and a processor configured to select a plurality of segment identifiers, access a data structure relating each of the plurality of segment identifiers to one or more nodes within a network, wherein interior gateway protocol (IGP) advertisements are used to communicate the segment identifiers for creation or updating of the data structure, assemble the plurality of segment identifiers into a segment identifier stack, wherein the segment identifier stack encodes a test path within the network for attempted routing of a test message, insert the segment identifier stack into a header associated with the test message, and forward the test message according to an entry in a forwarding table corresponding to a segment identifier at the top of the segment identifier stack, wherein IGP advertisements are used to communicate the segment identifier at the top of the segment identifier stack for creation or updating of the forwarding table.

13. The monitoring system of claim 12, further comprising:

the data structure;

the forwarding table; and a routing engine adapted to receive segment identifiers communicated using IGP advertisements, create the data structure relating segment identifiers to one or more nodes within the network, and create the forwarding table, wherein the forwarding table relates segment identifiers to corresponding network interfaces for forwarding of a message.

14. The monitoring system of claim 12, wherein the processor is further configured for data communication with a network node via the network interface, and the network node comprises:

the data structure;

the forwarding table; and a routing engine adapted to receive segment identifiers communicated using IGP advertisements, create the data structure relating segment identifiers to one or more nodes within the network, and create the forwarding table, wherein the forwarding table relates segment identifiers to corresponding network interfaces for forwarding of a message.

15. The monitoring system of claim 12, wherein the processor is further configured to determine whether the test message is routed through the entirety of the test path.

16. The monitoring system of claim 12, wherein the data structure comprises a model of a topology of an autonomous system within the network.

17. The monitoring system of claim 12, wherein the data structure comprises a link state database.

18. The monitoring system of claim 12, wherein:

the plurality of segment identifiers comprises an adjacency segment identifier; and the adjacency segment identifier is related by the data structure to a link between two adjacent nodes of the network.

19. The monitoring system of claim 18, wherein:

the plurality of segment identifiers comprises first and second adjacency segment identifiers related by the data structure to the same primary link between two adjacent nodes of the network;

the first adjacency segment identifier is associated with an instruction to protect the primary link with a backup link in the event of a failure of the primary link; and the second adjacency segment identifier is associated with an instruction not to protect the primary link with a backup link in the event of a failure of the primary link.

20. The monitoring system of claim 12, wherein:

the plurality of segment identifiers comprises a nodal segment identifier;

the nodal segment identifier is related by the data structure to a specific node of the network; and the nodal segment identifier represents a path through the network to the specific node.

21. The monitoring system of claim 18, wherein:

the plurality of segment identifiers further comprises a nodal segment identifier;

the nodal segment identifier is related by the data structure to a specific node of the network; and the nodal segment identifier represents a path through the network to the specific node.

* * * * *